(12) United States Patent
Oshima et al.

(10) Patent No.: US 7,333,958 B2
(45) Date of Patent: Feb. 19, 2008

(54) ELECTRONIC SETTLEMENT SYSTEM, SETTLEMENT MANAGEMENT DEVICE, STORE DEVICE, CLIENT DEVICE, DATA STORAGE DEVICE, COMPUTER PROGRAM, AND STORAGE MEDIUM

(75) Inventors: Takuya Oshima, Tokyo (JP); Takeshi Otsuka, Tokyo (JP); Akira Honjo, Tokyo (JP); Shinji Arakawa, Tokyo (JP)

(73) Assignee: Sony Corporation, Tokyo (JP)

( * ) Notice: Subject to any disclaimer, the term of this patent is extended or adjusted under 35 U.S.C. 154(b) by 27 days.

(21) Appl. No.: 11/278,633

(22) Filed: Apr. 4, 2006

(65) Prior Publication Data
US 2006/0167821 A1 Jul. 27, 2006

Related U.S. Application Data

(63) Continuation-in-part of application No. 09/852,566, filed on May 10, 2001, now Pat. No. 7,054,845.

(30) Foreign Application Priority Data

May 10, 2000 (JP) ............................. 2000-142307
Feb. 23, 2001 (JP) ............................. 2001-048916

(51) Int. Cl.
*G06Q 99/00* (2006.01)

(52) U.S. Cl. ............................. 705/65; 705/50; 705/64; 705/67; 705/71; 705/79; 380/200; 380/201; 380/202; 380/203; 713/150; 713/155; 713/182; 713/186; 713/165

(58) Field of Classification Search ............ 705/50–79; 380/200–203, 231–234; 726/2–5, 26–30; 713/150, 155, 182–186, 165, 193
See application file for complete search history.

(56) References Cited

U.S. PATENT DOCUMENTS 6,282,522 B1 * 8/2001 Davis et al. ................. 705/41

| 6,721,783 | B1 * | 4/2004 | Blossman et al. | ......... 709/206 |
|---|---|---|---|---|
| 2003/0101142 | A1 * | 5/2003 | Kambayashi et al. | ......... 705/57 |
| 2004/0083182 | A1 * | 4/2004 | Moribatake et al. | ......... 705/64 |

FOREIGN PATENT DOCUMENTS

EP 0421808 * 4/1991

OTHER PUBLICATIONS

Menezes et al., "Handbook of Applied Cryptography", 1997, CRC Press, pp. 26 and 27.*

* cited by examiner

*Primary Examiner*—Jalatee Worjloh
(74) *Attorney, Agent, or Firm*—Bell, Boyd & Lloyd LLP

(57) ABSTRACT

An effective electronic settlement system in which the number of checks is small. The electronic settlement system includes a data storage device such as an IC card in which value information is stored, a client device provided with an information input/output function to the data storage device, a store device for providing commodities or services, a settlement management device for managing settlement between the data storage device and the store device, and a communication system for connecting the client device, the store device, and the settlement management device so as to enable bidirectional communication. The settlement management device creates, based on settlement request information from the store device, settlement information for making settlement by the data storage device, subjects the settlement information to an encryption processing by using a common key shared by the settlement management device and the data storage device, and transmits the settlement information subjected to the encryption processing to the client device, and the client device outputs the settlement information received from the settlement management device to the data storage device.

7 Claims, 24 Drawing Sheets

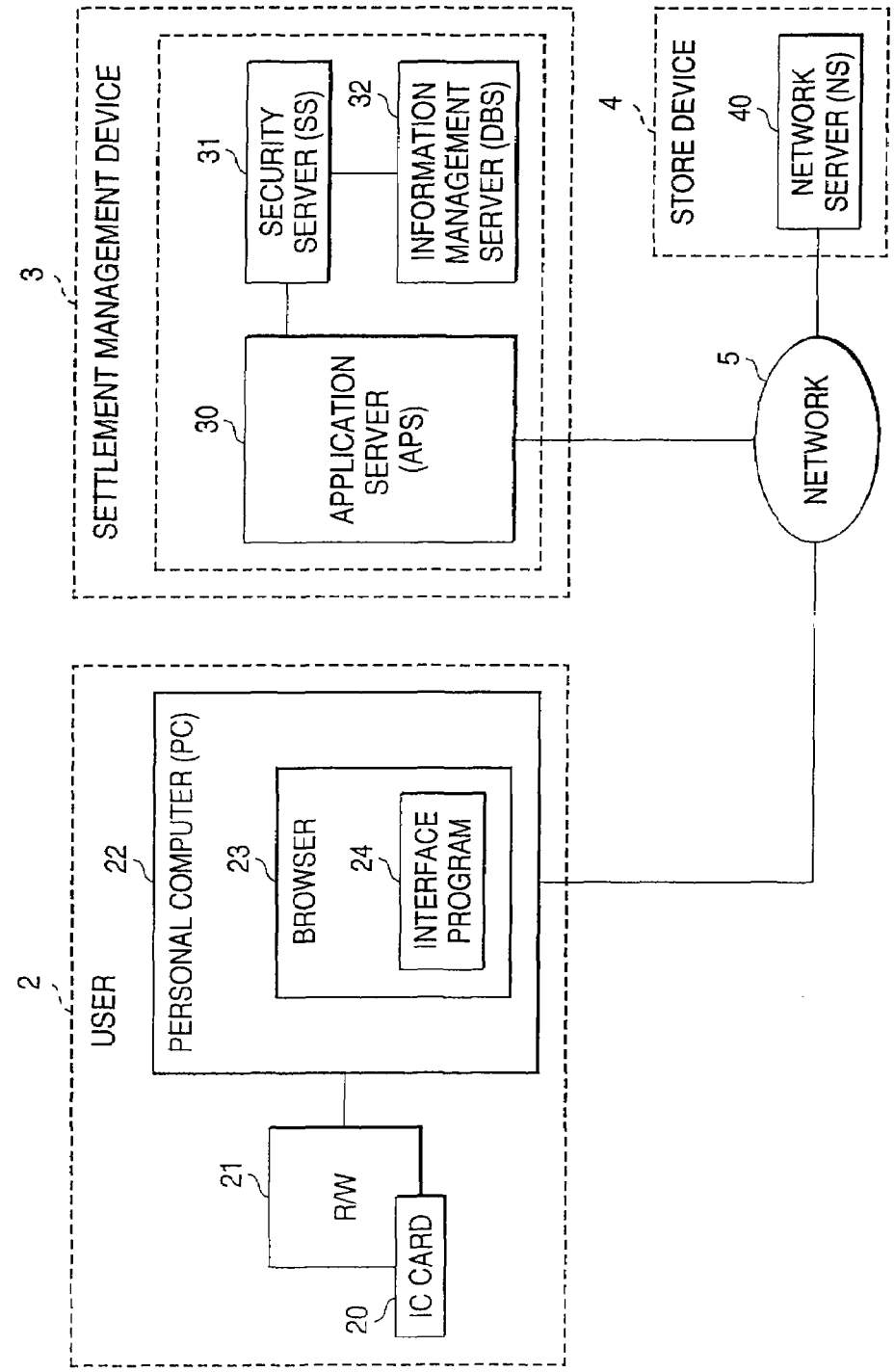

FIG. 12

MEMBER STORE PAGE
< SELECTION OF COMMODITY >
PLEASSE SELECT COMMODITY

| COMMODITY DESCRIPTION | UNIT PRICE |
|---|---|
| ■ AAAA | 350 |
| ■ BBBB | 400 |
| ☐ CCCC | 200 |

PURCHASE

FIG. 13

MEMBER STORE PAGE
< CART DISPLAY >

| COMMODITY DESCRIPTION | UNIT PRICE |
|---|---|
| AAAA | 350 |
| BBBB | 400 |
| TOTAL SUM | 750 |

TOTAL

ELECTRONIC SETTLEMENT SYSTEM, SETTLEMENT MANAGEMENT DEVICE, STORE DEVICE, CLIENT DEVICE, DATA STORAGE DEVICE, COMPUTER PROGRAM, AND STORAGE MEDIUM

CROSS REFERENCES TO RELATED APPLICATIONS

This application is a divisional of and claims the benefit of U.S. patent application Ser. No. 09/852,566, filed on May 10, 2001, now U.S. Pat. No. 7,054,845, which claims priority to Japanese Patent Application No. P2000-142307 filed on May 10, 2000, and Japanese Patent Application No. P2001-048916 filed on Feb. 23, 2001 the entire contents of which are incorporated herein.

BACKGROUND

The present invention relates to an electronic settlement system in which settlement processing, using a network or the like, can be safely carried out by using a data storage device holding a common key, as well as a settlement management device, a store device, a client device, a data storage device, a computer program, and a storage medium.

SUMMARY

In order to safely carry out electronic commercial transactions through an open network such as the Internet, a PKI (Public Key Infrastructure) protocol has been adopted.

In the PKI protocol, a transmission source creates signature information by using a private key, and the transmission source transmits the signature information together with transmission information to a transmission destination. At the transmission destination, by checking the signature information by using a public key corresponding to the private key, it is judged whether or not the received transmission information is created by a proper transmission source.

In recent years, there has been an attempt to carry out electronic commercial transactions through a network by using a data storage device such as an IC (Integrated Circuit) card. Here, in general, the data storage device holds a common key, and carries out input/output of secret information using a common key encryption system. In this sort of data storage device, since the common key cannot become a key for creating signature information, there is merit in that, even in the case where the data storage device is lost, the damage can be made low.

However, in order to safely carry out the electronic commercial transactions through the network, it is necessary to create signature information by using a private key. However, in the conventional method, since the data storage device such as the IC card does not hold (store) the private key, there is a problem that the signature information can not be created. In this case, although it is also conceivable to adopt a method in which the data storage device holds the private key, as described above, since the private key can create the signature information, it has the same effect as certificate of a seal impression, and there is a problem that the damage is too high when the data storage device is lost and is used for an evil purpose.

Besides, if the electronic commercial transactions are carried out through the network by using only the common key encryption system adopted by the data storage device as described above, since a lot of opposite partner server devices or the like of the transactions have the common key, there is also a problem that such a probability becomes high that the common key is stolen or is used for an evil purpose.

In the present electronic settlement system, SSL (Secure Socket Layer) or SET (Secure Electronic Transaction) is often adopted. However, in the SSL, although safety to a communication path between a client device and a store device is assured, there is a problem that a dishonesty at the store side cannot be detected.

Although the SET has both the merit of the SSL and merit that falsifying can not be made by the client device, the store device, and the settlement management device, since the respective devices must have certificates of the PKI, there are problems that it is troublesome and expensive. Further, signature and signature check must be performed many times and it is redundant.

Moreover, the current electronic commercial transaction system does not include confirmation as to whether value information confirmed by the user on the client device is identical to value information actually written in the data storage device such as the IC card.

The present invention has been made in view of the problems of the prior art, and an object thereof is to provide an electronic settlement system in which electronic commercial transactions using a network can be safely carried out by using a data storage device holding a common key, as well as a settlement management device, a store device, a client device, a data storage device, a computer program, and a storage medium.

In order to solve the problems, according to the present invention, a novel and improved electronic settlement system, settlement management device, store device, client device, data storage device, computer program, and storage medium are provided.

According to a first embodiment of the present invention, an electronic settlement system includes a data storage device in which value information is stored, a client device provided with an information input/output function to the data storage device, a store device for providing commodities or services, a settlement management device for managing settlement between the data storage device and the store device, and a communication system for connecting the client device, the store device, and the settlement management device so as to enable bidirectional communication, wherein the settlement management device creates settlement information for making settlement by the data storage device, based on settlement request information from the store device, subjects the settlement information to an encryption processing by using a common key shared by the settlement management device and the data storage device, and transmits the settlement information subjected to the encryption processing to the client device, and the client device outputs the settlement information received from the settlement management device to the data storage device.

In the electronic settlement system, the store device may create a first signature indicating validity of the settlement request information by using a private key of the store device, and transmit the settlement request information with the first signature to the settlement management device, and the settlement management device may check validity of the first signature received from the store device by using a public key corresponding to the private key of the store device.

The settlement request information with the first signature may be transmitted to the settlement management device through the client device.

The settlement management device may create a second signature indicating validity of the settlement information with the first signature by using a private key of the settlement management device, and transmit the settlement information given the second signature and subjected to the encryption processing to the client device, and the client device may check validity of the second signature received from the settlement management device by using a public key corresponding to the private key of the settlement management device, and then, outputs the settlement information to the data storage device.

The settlement management device may create settlement completion information, create a third signature indicating validity of the settlement completion information by using the private key of the settlement management device, and transmit the settlement completion information including the settlement information and given the third signature to the store device.

The store device may check validity of the third signature received from the settlement management device by using the public key corresponding to the private key of the settlement management device.

The store device may receive the settlement completion information with the third signature, create settlement completion receipt information with a fourth signature by using the private key of the store device, and transmit the settlement completion receipt information with the fourth signature to the client device, and the settlement management device and the client device may check validity of the fourth signature received from the store device by using the public key corresponding to the private key of the store device.

The store device may be constructed as a single store device, or may be constructed as a mall including a number of lower store devices.

Further, according to another embodiment of the present invention, in a settlement management device which can update value information stored in a data storage device through a client device, the settlement management device subjects value update information of the data storage device to an encryption processing by using a common key shared by the settlement management device and the data storage device, and transmits the value update information subjected to the encryption processing to the client device, and the client device inputs the received value update information to the data storage device.

The settlement management device may create a fifth signature indicating validity of the value update information by using a private key of the settlement management device, and transmit the value update information with the fifth signature to the client device, and the client device may check validity of the fifth signature received from the settlement management device by using a public key corresponding to the private key of the settlement management device, and then, input the value update information to the data storage device.

The settlement management device for managing settlement between the data storage device storing the value information and a store device for providing commodities or services may include a settlement information creation part for creating settlement information for making settlement by the data storage device, based on settlement request information from the store device, a settlement information encryption part for subjecting the settlement information to an encryption processing by using a common key shared by the settlement management device and the data storage device, and a settlement information output part for outputting the settlement information subjected to the encryption processing to the data storage device through the client device provided with an information input/output function to the data storage device.

The store device may create a first signature indicating validity of the settlement request information by using a private key of the store device, and transmit the settlement request information with the first signature to the settlement management device, and the settlement management device may check validity of the first signature received from the store device by using a public key corresponding the private key of the store device.

The settlement management device may create a second signature indicating validity of the settlement information with the first signature by using a private key of the settlement management device, and transmit the settlement information subjected to the encryption processing and given the second signature to the client device which can check validity of the second signature by using a public key corresponding to the private key of the settlement management device and output it to the data storage device.

The settlement management device may create settlement completion information, create a third signature indicating validity of the settlement completion information by using the private key of the settlement management device, and transmit the settlement completion information including the settlement information and given the third signature to the store device which can check validity of the third signature by using the public key corresponding to the private key of the settlement management device.

The store device may receive the settlement completion information with the third signature, create settlement completion receipt information with a fourth signature by using the private key of the store device, and transmit the settlement completion receipt information with the fourth signature to the settlement management device, and the settlement management device may check validity of the fourth signature received from the store device by using the public key corresponding to the private key of the store device.

Further, according to another aspect of the present invention, there is provided a computer program causing a computer to function as the settlement management device.

Moreover, according to another embodiment of the present invention, there is provided a computer readable storage medium storing the computer program which causes a computer to function as the settlement management device.

Moreover, according to another embodiment of the present invention, in a store device for providing commodities or services based on settlement made through a settlement management device between the store device and a data storage device storing value information, the store device includes a settlement request information creation part for creating settlement request information, a first signature creation part for creating a first signature indicating validity of the settlement request information by using a private key of the store device, and a settlement request information transmission part for transmitting the settlement request information with the first signature to the settlement management device which can check validity of the first signature by using a public key corresponding to the private key of the store device.

The settlement management device may create settlement information for making settlement by the data storage device, based on the settlement request information from the store device, subject the settlement information to an encryption processing by using a common key shared by the settlement management device and the data storage device, and transmit the settlement information subjected to the encryption processing to the client device, and the client device may output the settlement information received from the settlement management device to the data storage device.

The settlement request information with the first signature may be transmitted from the store device to the settlement management device through the client device.

The settlement management device may create settlement completion information, create a third signature indicating validity of the settlement completion information by using a private key of the settlement management device, and transmit the settlement completion information including the settlement information and given the third signature to the store device, and the store device may check validity of the third signature received from the settlement management device by using a public key corresponding to the private key of the settlement management device.

The store device may receive the settlement completion information with the third signature, create settlement completion receipt information with a fourth signature by using the private key of the store device, and transmit the settlement completion receipt information with the fourth signature to the settlement management device and the client device, and the settlement management device and the client device may check validity of the fourth signature received from the store device by using the public key corresponding to the private key of the store device.

The store device may be constructed as a single store device, or may be constructed as a mall including a number of lower store devices.

Further, according to another embodiment of the present invention, there is provided a computer program causing a computer to function as the store device.

Moreover, according to another embodiment of the present invention, there is provided a computer readable storage medium storing the computer program which causes a computer to function as the store device.

Moreover, according to another embodiment of the present invention, in a client device provided with an information input/output function to a data storage device used when settlement between a store device for providing commodities or services and the data storage device storing value information is made through a settlement management device, the client device includes a settlement information receipt part for receiving settlement information which is created by the settlement management device based on settlement request information from the store device and is subjected to an encryption processing by using a common key shared by the settlement management device and the data storage device, and a settlement information output part for outputting the settlement information received from the settlement management device to the data storage device.

The store device may create a first signature indicating validity of the settlement request information by using a private key of the store device, and transmit the settlement request information with the first signature to the settlement management device through the client device, and the settlement management device may check validity of the first signature received from the store device by using a public key corresponding the private key of the store device.

The settlement management device may create a second signature indicating validity of the settlement information with the first signature by using a private key of the settlement management device, and transmit the settlement information given the second signature and subjected to the encryption processing to the client device, and the client device may check validity of the second signature received from the settlement management device by using a public key corresponding to the private key of the settlement management device, and then, output the settlement information to the data storage device.

The settlement management device may create settlement completion information, create a third signature indicating validity of the settlement completion information by using the private key of the settlement management device, and transmit the settlement completion information including the settlement information and given the third signature to the store device, the store device may check validity of the third signature received from the settlement management device by using the public key corresponding to the private key of the settlement management device, create settlement completion receipt information with a fourth signature by using the private key of the store device, and transmit the settlement completion receipt information with the fourth signature to the client device, and the client device may check validity of the fourth signature received from the store device by using the public key corresponding to the private key of the store device. With respect to the settlement completion receipt information, a user himself may confirm the settlement completion receipt information displayed on a display screen.

Further, according to another embodiment of the present invention, there is provided a computer program causing a computer to function as the client device.

Moreover, according to another embodiment of the present invention, there is provided a computer readable storage medium storing the computer program which causes a computer to function as the client device.

Further, according to another embodiment of the present invention, in a data storage device storing value information used when settlement between the data storage device and a store device for providing commodities or services is made through a settlement management device, settlement information which is created by the settlement management device based on settlement request information from the store device and is subjected to an encryption processing by using a common key shared by the settlement management device and the data storage device can be inputted through a client device provided with an information input/output function to the data storage device.

The store device may create a first signature indicating validity of the settlement request information by using a private key of the store device, and transmit the settlement request information with the first signature to the settlement management device, the settlement management device may check validity of the first signature received from the store device by using a public key corresponding to the private key of the store device, create a second signature indicating validity of the settlement information with the first signature by using a private key of the settlement management device, and transmit the settlement information given the second signature and subjected to the encryption processing to the client device, and the client device may check validity of the second signature received from the settlement management device by using a public key corresponding to the private key of the settlement management device, and then, output the settlement information to the data storage device.

Further, according to another embodiment of the present invention, an electronic settlement system includes a data storage device in which value information is stored, a client device provided with an information input/output function to the data storage device, a store device for providing commodities or services, the store device creating settlement information for the data storage device in accordance with a purchase request from the client device, a settlement management device for managing settlement between the data storage device and the store device, the settlement management device creating settlement information for making settlement by the data storage device, based on settlement request information from the store device, subjecting the settlement information to an encryption processing by using a common key shared by the settlement management device and the data storage device, and transmitting the settlement information subjected to the encryption processing to the client device, and a communication system for connecting the client device, the store device, and the settlement management device so as to enable bidirectional communication.

The store device may create a first signature indicating validity of the settlement request information by using a private key of the store device, and transmit the settlement request information with the first signature to the settlement management device, and the settlement management device may check validity of the first signature received from the store device by using a public key corresponding to the private key of the store device.

The settlement request information with the first signature may be transmitted to the settlement management device through the client device.

The settlement management device may create a second signature indicating validity of the settlement information with the first signature by using a private key of the settlement management device, and transmit the settlement information given the second signature and subjected to the encryption processing to the client device, and the client device may check validity of the second signature received from the settlement management device by using a public key corresponding to the private key of the settlement management device, and then, output the settlement information to the data storage device.

The settlement management device may create settlement completion information, create a third signature indicating validity of the settlement completion information by using the private key of the settlement management device, and transmit the settlement completion information including the settlement information and given the third signature to the store device.

The store device may check validity of the third signature received from the settlement management device by using the public key corresponding to the private key of the settlement management device.

The store device may receive the settlement completion information with the third signature, create settlement completion receipt information with a fourth signature by using a private key of the store device, and transmit the settlement completion receipt information with the fourth signature to the client device, and the settlement management device and the client device may check validity of the fourth signature received from the store device by using a public key corresponding to the private key of the store device. With respect to the settlement completion receipt information, a user himself may confirm the settlement completion receipt information displayed on a display screen.

The store device may be constructed as a single store device, or may be constructed as a mall including a number of lower store devices.

Here, for facilitating understanding of the present invention, common terms in the present invention will be summarized and explained in brief.

The electronic settlement system is a system in which, in the case where a commodity or service is sold through an online communication system such as the Internet, payment settlement is electrically made through the online communication system. As a method of making the settlement through the online communication system, payment by a credit card, a cash card or a debit card, or payment by electronic money such as a prepaid card is possible.

The data storage device is a data carrier such as an IC card having a card shape, or is an IC chip itself storing at least data such as value information, and any shape may be adopted as long as it is a secure device incorporating this sort of IC chip. With respect to the data in the data carrier such as the IC card, transfer of the data is carried out by communication with another device such as a portable telephone which can recognize the data carrier. The IC chip may be mounted on a portable device such as a portable telephone, a portable communication terminal device, or a watch.

The data storage device is such that an IC chip is embedded in a card of plastic or the like. A type including only a memory chip is called a memory card, and a type including a CPU is called a card with a built-in CPU. Further, the data storage device can be classified by contact and non-contact to a reader/writer in addition to the kind based on the existence of a CPU. A contact type has a metal terminal on a surface, and supply of electric power to the reader/writer and transfer of data are carried out through the terminal. On the other hand, a non-contact type includes an antenna in the inside, and supply of electric power and reading/writing of data are carried out through the antenna.

The value information is information which is stored in a data storage device and relates to an exchangeable value as a counter value to provision of a commodity or service. The value information includes something that has a monetary value equivalent to a currency, and something that has a pseudo monetary value exchangeable for a commodity or service, such as a point.

The client device is a terminal device including at least an information input/output function to a data storage device, and a function enabling bidirectional communication to another terminal device or server through an online communication system such as the Internet. The client device is generally a computer device provided with an arithmetic device, a storage device, a display device, an input/output device, a communication device, a data storage device reader/writer, and the like. The client device includes a portable terminal device, a portable telephone device, and the like having the same function. A set place of the client device may be a home of a user or an office, or a store in which a client terminal dedicated to the settlement system is set. In the case where the client device is constructed by a portable telephone, and the data storage device of the present invention is constructed by an IC chip, they can also be integrally constructed such that the data storage device is mounted in the client device.

The store device is a network server selling and providing commodities or services through an online communication system such as the Internet. The store device may be constructed by a single network server or may be constructed as a mall constructed by a number of network servers.

The settlement management device is a management server for managing settlement between, for example, a data storage device and a store device, and is constructed by a security server, an application server, a database server, and the like.

The communication system is an online communication system constructed so as to enable bidirectional communication through a predetermined communication protocol, such as the Internet using a public network, LAN (Local Area Network), or WAN (Wide Area Network), and a connection mode may be wired or wireless.

The settlement request information is created by a store device, and includes various information for requesting a settlement management device to make settlement to a purchase request transmitted to the store device. The purchase request may be transmitted by a user through a client device to the store device, or may be transmitted without passing through the client device.

The settlement information is created by a settlement management device on the basis of settlement request information transmitted from a store device to the settlement management device, and includes various information for making settlement by increasing or decreasing value information stored in a data storage device through a client device from the settlement management device. The security of the settlement information is secured by an encryption processing using a common key shared by the settlement management device and the data storage device. Further, the validity of the settlement information is secured in such a manner that a second signature created by using a private key of the management device is affixed, and the client device checks the second signature by using a public key corresponding to the private key of the settlement management device.

The settlement completion information is created after the settlement management device confirms that settlement has been made by increasing or decreasing the value information stored in the data storage device, and is transmitted to the store device, and includes various information relating to settlement completion. The validity of the settlement completion information is secured in such a manner that a third signature created by using the private key of the settlement management device is affixed, and the store device checks the third signature by using the public key corresponding to the private key of the settlement management device.

The settlement completion receipt information is created after the store device confirms that settlement has been made on the basis of the data storage device owned by the user, and is transmitted to the settlement management device and the client device. By this, completion of the settlement is confirmed, and it becomes possible to deliver a commodity or service from the store device to the user. The validity of the settlement completion receipt information is secured in such a manner that a fourth signature created by using a private key of the store device is affixed, and the settlement management device and the client device check the fourth signature by using a public key corresponding to the private key of the store device.

The value update information is information for increasing or decreasing value information stored in a data storage device, and is inputted to the data storage device from the settlement management device through the client device. The security of the value update information is secured by an encryption processing using a common key shared by the settlement management device and the data storage device. Further, the validity of the value update information is secured in such a manner that a fifth signature created by using a private key of the settlement management device is affixed, and the client device checks the fifth signature by using a public key corresponding to the private key of the settlement management device.

The common key is a key used for both encryption and decryption in the so-called common key encryption system, and a sender and a receiver share the key. In the present invention, the common key is set between the settlement management device and the data storage device.

The private key is a key used for encryption in the so-called public key encryption system, and information encrypted by the private key can be decrypted by a corresponding public key held in an authentication bureau or the like.

The public key is a key used for decryption in the so-called public key decryption system, and is generally held in an authentication bureau or the like. When information encrypted by the private key is decrypted, a receiver gets the public key from the authentication bureau and decrypts it.

The electronic signature assures the validity of transmitted information, and in the present invention, a first signature to a fifth signature are used according to the kinds of a transmission side and a reception side.

The first signature is a signature which is created by a private key of the store device, is affixed to settlement request information, and is checked by using a corresponding public key in the settlement management device.

The second signature is a signature which is created by a private key of the settlement management device, is affixed to settlement information, and is checked by using a corresponding public key in the client device.

The third signature is a signature which is created by a private key of the settlement management device, is affixed to settlement completion information, and is checked by using a corresponding public key in the store device.

The fourth signature is a signature which is created by a private key of the store device, is affixed to settlement completion receipt information, and is checked by using a corresponding public key in the settlement management device.

The fifth signature is a signature which is created by a private key of the settlement management device, is affixed to value update information, and is checked by using a corresponding public key in the client device.

Additional features and advantages are described herein, and will be apparent from, the following Detailed Description and the figures.

BRIEF DESCRIPTION OF THE FIGURES

FIG. 1 is a total structural view of an electronic settlement system according to an embodiment of the present invention;

FIG. 12 is a view of a screen constitution example displayed in a client device during a settlement operation of the electronic settlement system shown in FIG. 1;

FIG. 13 is a view of a screen constitution example displayed in the client device during the settlement operation of the electronic settlement system shown in FIG. 1;

DETAILED DESCRIPTION

Figure 2A:
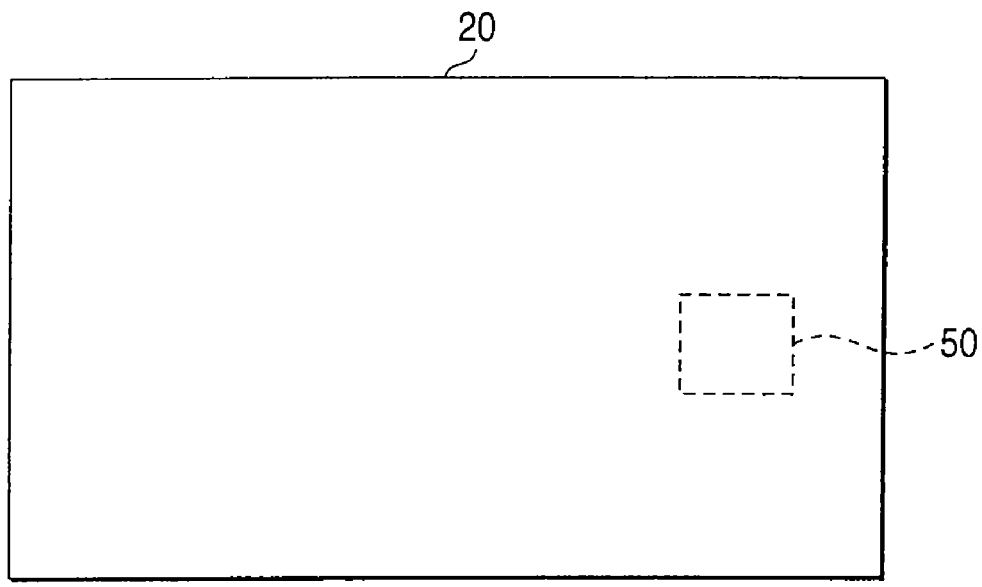
FIGS. 2A and 2B are schematic explanatory views for explaining the structure of a data storage device such as an IC card shown in FIG. 1.

An electronic settlement system, a settlement management device, a store device, a client device, a data storage device, a computer program, and a storage medium according to preferred embodiments of the present invention will be described below with reference to the accompanying drawings.

FIG. 1 is a total structural view of an electronic settlement system 1 to which an electronic settlement system of an embodiment can be applied.

As shown in FIG. 1, in the electronic settlement system 1, communication through a network 5 such as the Internet, which is a bidirectional communication system through a predetermined communication protocol, can be carried out among a user 2 including a client device and a data storage device such as an IC card, a settlement management device 3, and a store device 4.

User 2

In the user 2, there is provided a client device constructed by a data storage device 20 such as an IC card, a reader/writer device 21 for accessing the data storage device 20 to input and output information, a personal computer 22, and the like.

Figure 2B:
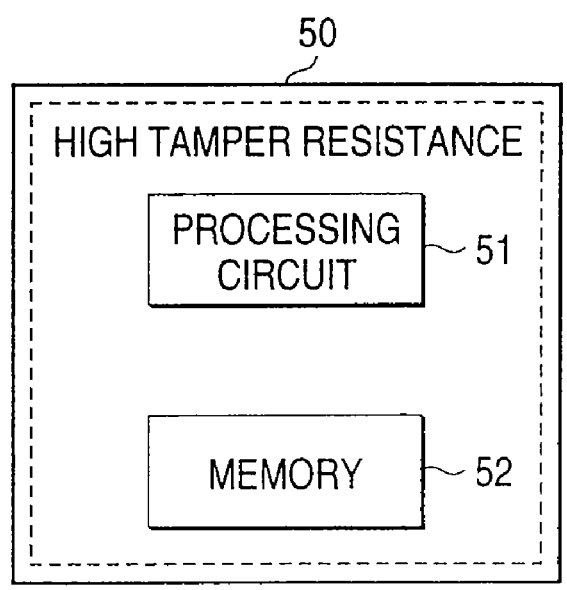

The data storage device 20 is such that for example, an IC chip is embedded in a card of plastic or the like. The data storage device 20 such as the IC card includes a tamper-resistant IC module 50 as shown in FIG. 2A, and has a built-in processing circuit 51 and a built-in memory 52 in the IC module 50 as shown in FIG. 2B.

The processing circuit 51 of the data storage device 20 can perform various processings such as a decryption processing using a common key KC shared by a security server 31 of the settlement management device 3, a processing in response to predetermined information and request, and a mutual authentication processing.

The memory 52 stores the common key KC shared by the security server 31 of the settlement management device 3.

Figure 3:
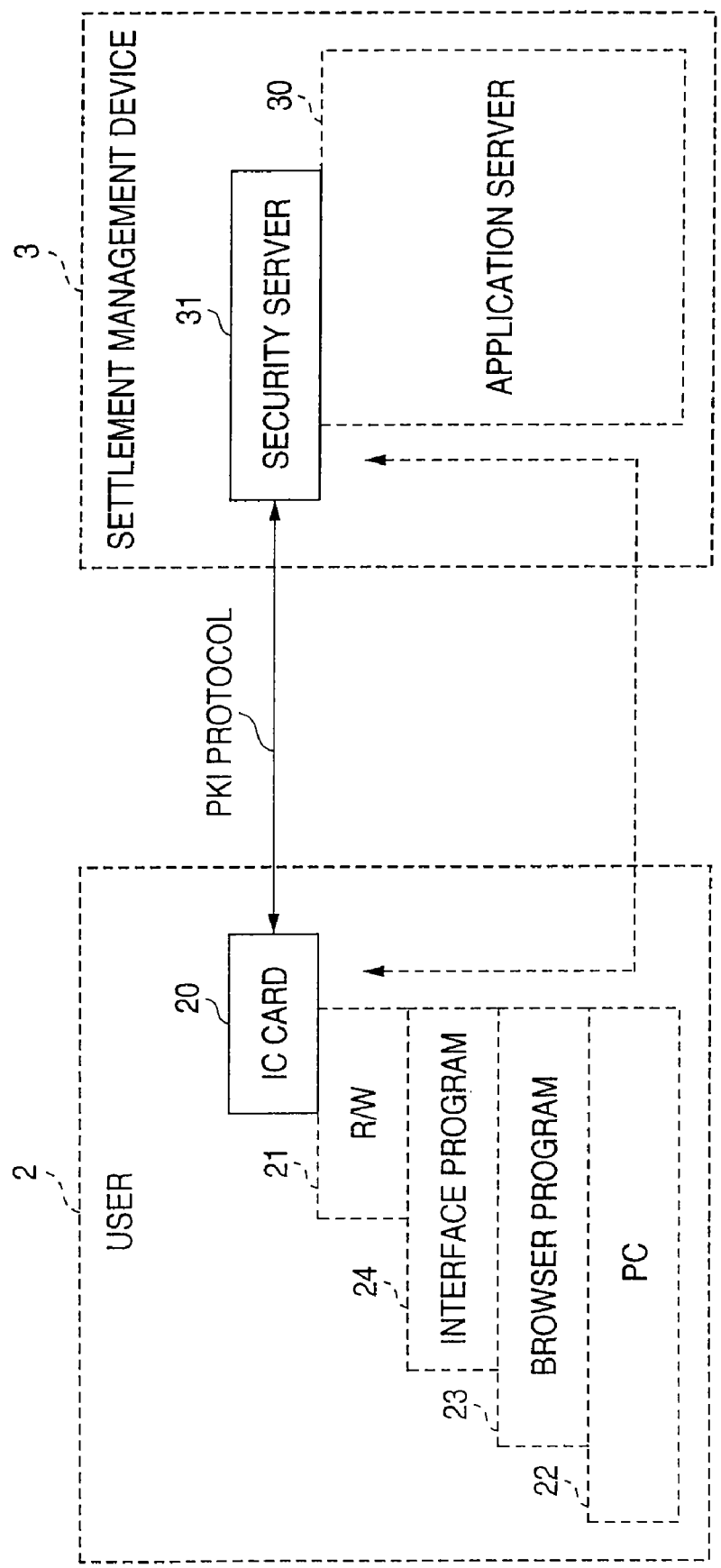
FIG. 3 is a structural view showing another structural example of an electronic settlement system according to an embodiment of the present invention.

As shown in FIG. 3, the data storage device 20 communicates with the personal computer 22 through a data storage device reader/writer 21, and is connected to the network 5 such as the Internet through an interface program 24 such as an ActiveX component driven in the personal computer 22 and a browser program 23. Further, the data storage device 20 is connected to the security server 31 through an application server 30 of the settlement management device 3, and transmits and receives information to and from the security server 31. Information communication between the data storage device 20 and the security server 31 established in this way is encrypted and decrypted by a common key encryption system (PKI protocol) using the common key KC, so that the security is secured.

Incidentally, value information is stored in the data storage device such as the IC card. The value information is information relating to an exchangeable value as a counter value to provision of a commodity or service. The value information includes something that has a monetary value equivalent to a currency, and something that has a pseudo monetary value exchangeable for a commodity or service, such as a point.

The reader/writer 21 of the data storage device performs data input/output to the IC module 50 of the data storage device 20 in a non-contact system or a contact system, and performs input/output of information and request to the personal computer 22.

The personal computer 22 executes the browser program 23 in accordance with the operation of a keyboard or a mouse by the user, and executes, on the browser program 23, the interface program 24 such as the ActiveX component received from the application server 30 of the settlement management device 3 through the network 5 as described later.

The personal computer 22 includes a display, a keyboard, a mouse, and the like. In the example shown in the drawing, although the personal computer 22 to which the reader/writer 21 can be connected is indicated as an example of the client device, in addition to the personal computer 22, a portable terminal device, a portable telephone terminal device, or the like can be used if a device can perform an information exchange to the data storage device such as the IC card in a contact or non-contact manner.

Figure 4:
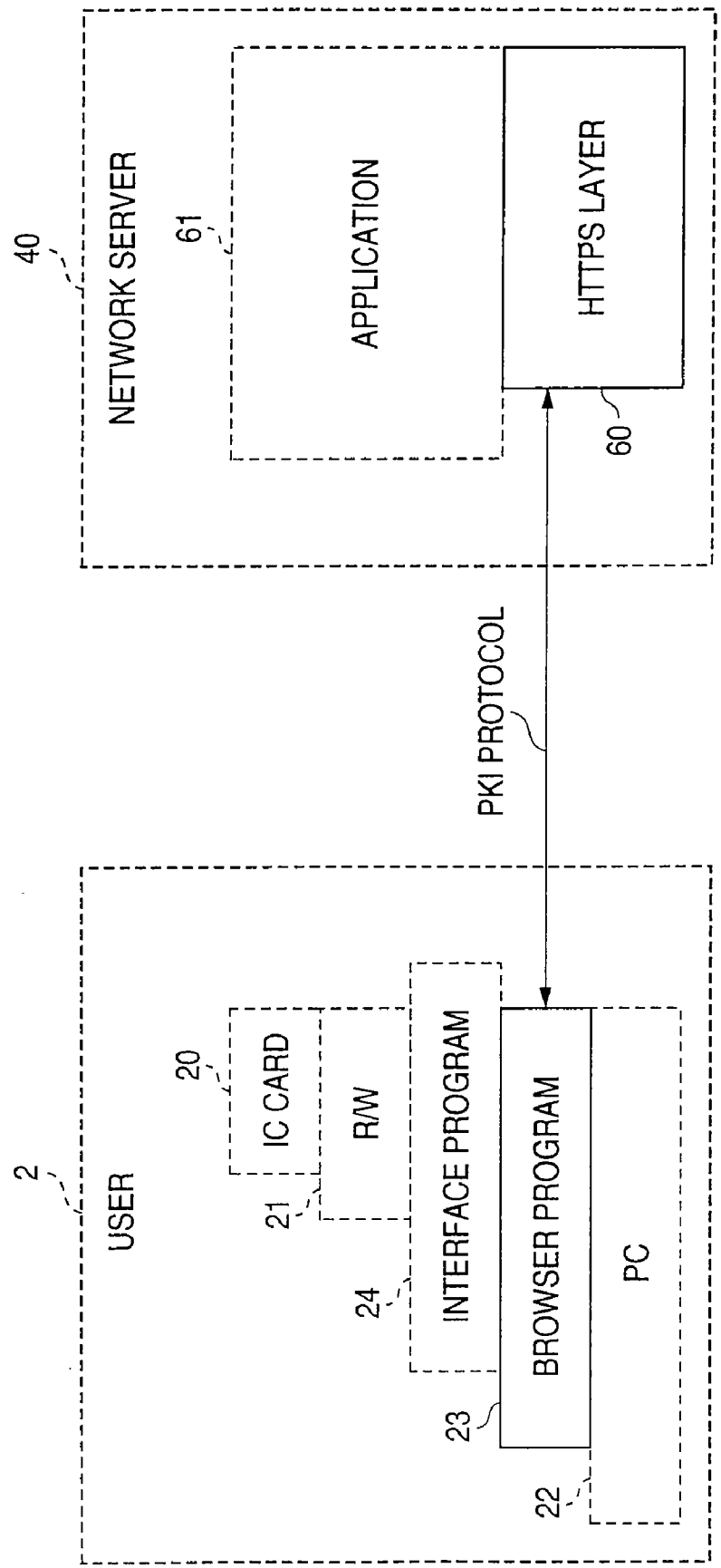
FIG. 4 is a structural view showing the flow of information in an electronic settlement system according to an embodiment of the present invention.

As shown in FIG. 4, for example, like Internet Explorer of Microsoft Corp, the browser program 23 is a program which operates on the personal computer 22 and can display a service provided by a network server on a terminal at the side of a client. In this embodiment, between the browser program 23 and a HTTPS layer 60 of a network server 40 of the store device 4, by the PKI protocol, the addition of signature information is made at a transmission side by using its own private key, and the check of the signature information is made at a transmission destination by using a public key corresponding to the private key.

Figure 5:
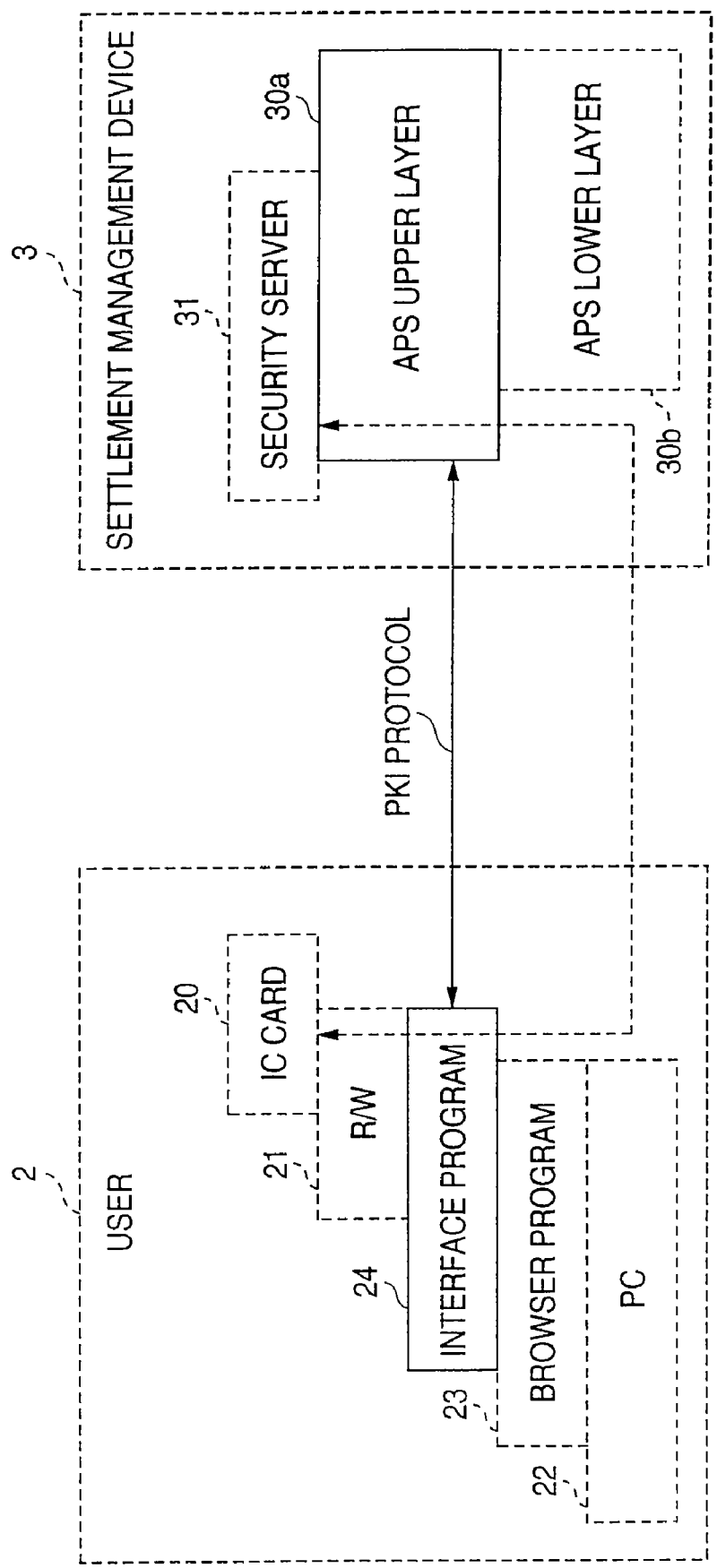
FIG. 5 is a view for explaining a communication method between a data storage device, such as an IC card, of a user and a security server of a settlement management device.

As shown in FIG. 5, the interface program 24 operates on the personal computer 22, and is a program which can add signature information at a transmission side by using its own private key and check the signature information by using a public key corresponding to the private key at a transmission destination, by the PKI protocol between the interface program and an APS upper layer 30a of the application server 30 of the settlement management device 4.

The interface program 24 also functions as a function expanding program for easily realizing access to local resources such as the data storage device 20 through the reader/writer 21 during execution of the browser program 23.

Settlement Management Device 3

Figure 6:
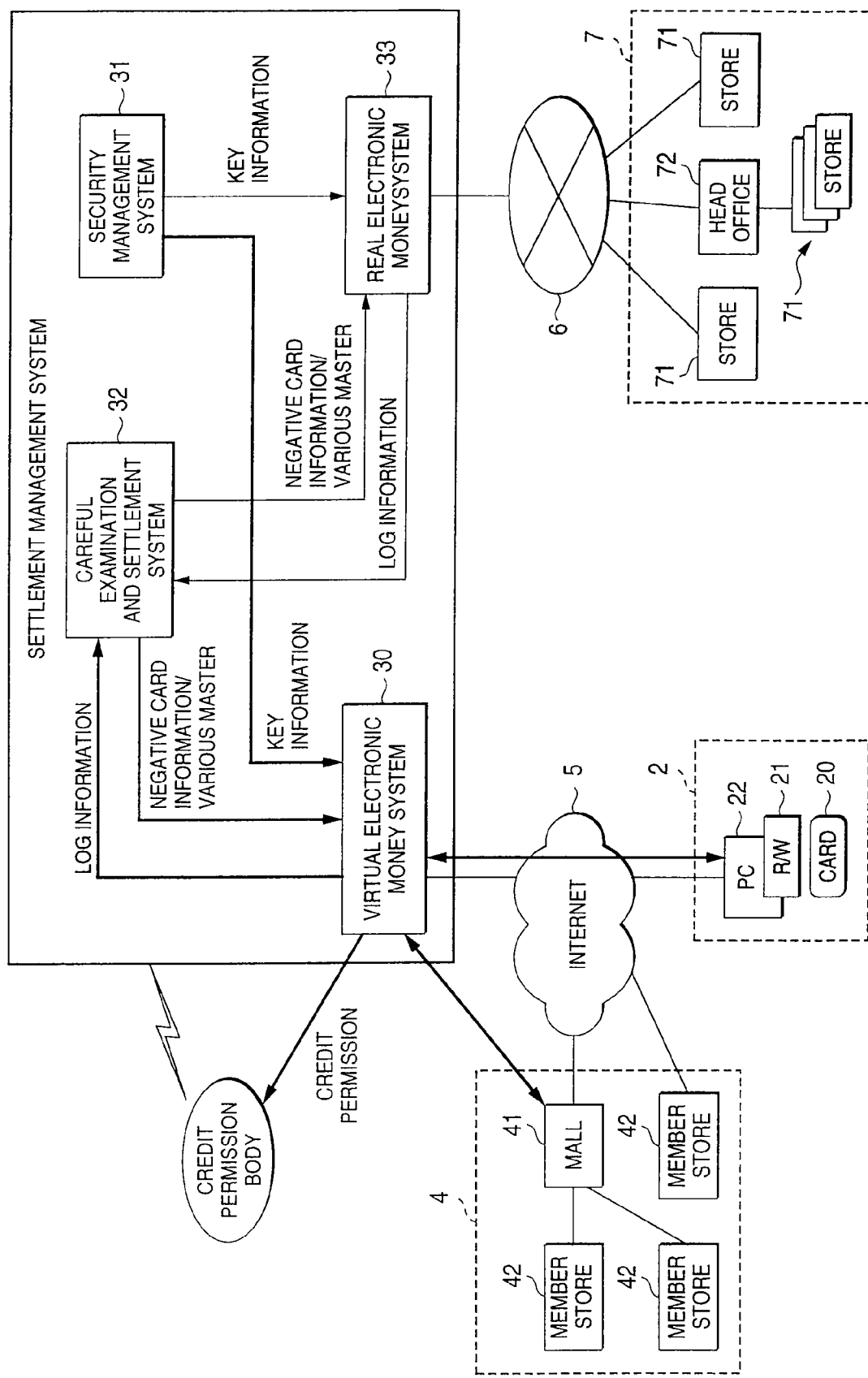
FIG. 6 is a view for explaining a communication method between a personal computer of a user and a network server of a store.

As shown in FIGS. 1 and 6, the settlement management device 3 is provided with the application server 30 functioning as a virtual electronic money system, the security server 31 functioning as a security management system, and an information management server 32 functioning as a careful examination and settlement system, and further, an application server 33 functioning as a real electronic money system, which does not directly relate to this embodiment.

The application server 30 of the settlement management device 3 can carry out bidirectional communication with the personal computer 22 of the user 2 or the network server 40 of the store device 4 through the network 5 such as the Internet.

The application server 30 of the settlement management device 3 holds a public key KSHOP,P corresponding to a private key KSHOP,S of the network server 40 of the store device 4, and as described later, checks first signature information SIG1 affixed to settlement request information BILL created by the network server 40 of the store device 4.

Further, as shown in FIG. 5, the application server 30 of the settlement management device 3 includes the APS upper layer 30a and an APS lower layer 30b.

The security server 31 of the settlement management device 3 stores a common key KC shared by the data storage device 20 of the user 2.

As shown in FIG. 5, the security server 31 of the settlement management device 3 encrypts and decrypts information transmitted and received to and from the data storage device 20 through the reader/writer 21 of the data storage device, the interface program 24, the browser program 23, the personal computer 22, the network 5, and the application server 30 by a common key encryption system.

The information management server 32 stores and manages, for example, personal information of a registered user.

Store Device 4

The store device 4 is provided with the network server 40.

As shown in FIG. 4, the network server 40 of the store device 4 is constructed such that bidirectional communication can be carried out through the PKI protocol between the browser program 23 operating on the personal computer 22 and the HTTPS layer.

The network server 40 stores, for example, introduction information of commodities or services, and creates the settlement request information BILL requesting settlement corresponding to the sum which the store device 4 charges the user 2, and the first signature information SIG created by using its own private key KSHOP,S to the settlement request information.

As shown in FIG. 6, the store device 4 can be constructed as a single member store 42 as shown in FIG. 6. Alternatively, as shown in FIG. 6, the store device 4 can also be constructed as a member store 42 constructed as a member store of a mall 41.

The structural example of the electronic settlement system shown in FIG. 6 includes, in addition to the virtual electronic money system 30 which is applied to the settlement when the user does the shopping through the personal computer 22 or the like, the real electronic money system 33 which is applied to the settlement when the user actually goes to a store 7 and really does the shopping.

The real store 7 which the user can actually visit is connected to the real electronic money system 33 through a communication system such as a public network 6. The real store 7 can be constructed as an independent store 71, or can also be constructed as a dependent store 71 dependent on a head office 72. However, since the real electronic money system 33 is different from the gist of the present invention, the detailed description is omitted.

Figure 7:
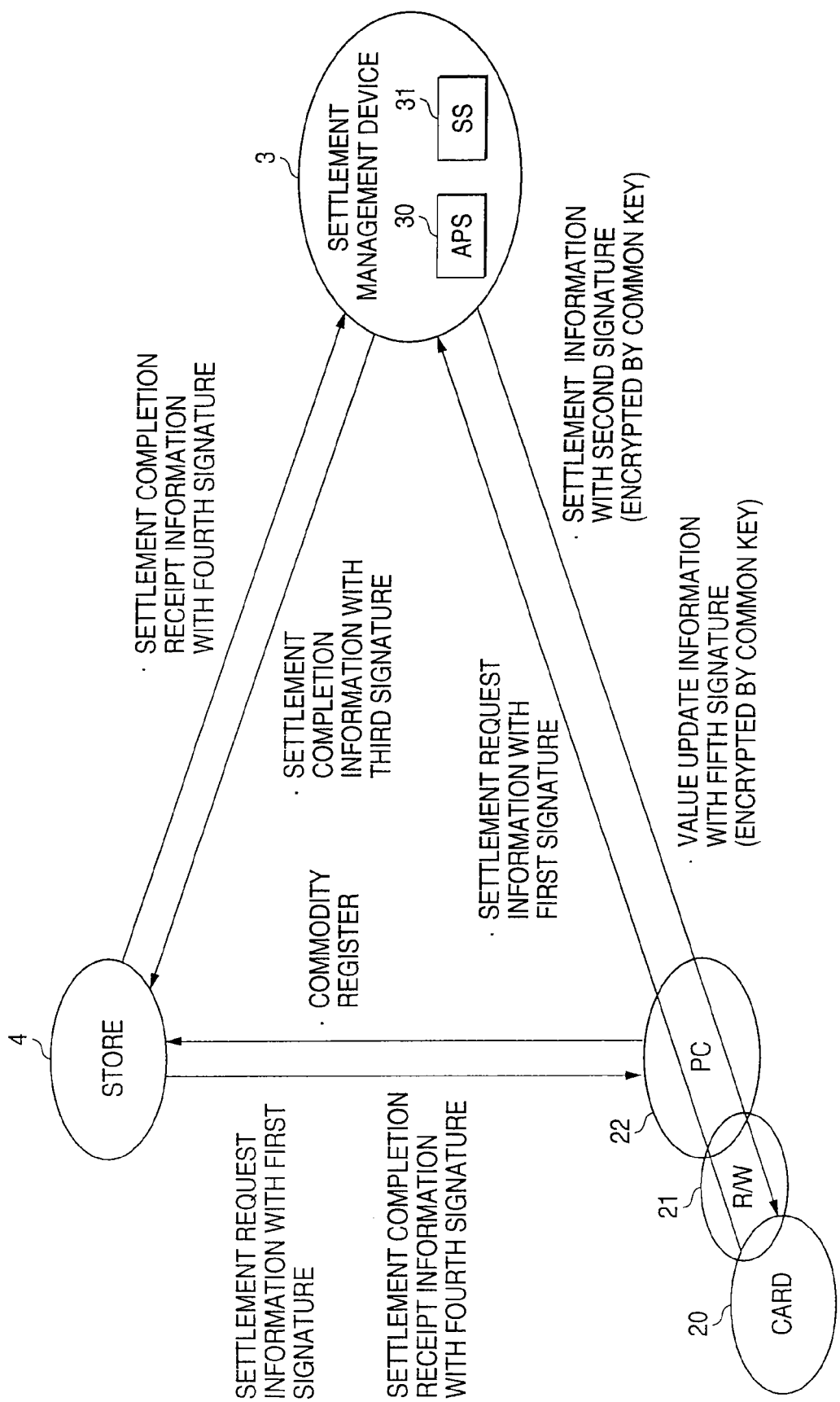
FIG. 7 is a view for explaining a communication method between a personal computer of a user and an application server of a settlement management device.

Next, the flow of information in the settlement system of the embodiment will be described with reference to FIG. 7.

As already described, in the settlement system of the embodiment, a receiver and a sender of information are the settlement management device 3, the store device 4, the client device 2 constituted by the personal computer 22 and the reader/writer 21, and the data storage device 20 such as the IC card.

The information circulating among the receiver and the sender of the information includes purchase request information, settlement request information, settlement information, settlement completion information, settlement completion receipt information, value update information and the like.

The purchase request information is such that the user accesses the network server 40 of the store device 4 through the browser 23 of the personal computer 22 as the client device, selects a commodity or service which the user desires to purchase among commodities and services laid out at the site of the store device 4, and transmits the information to the store device 4.

The settlement request information is created by the store device 4, and includes various information for requesting the settlement management device 3 to make settlement to the purchase request information transmitted by the user to the store device through the personal computer 22 as the client device. The validity of the settlement request information is secured in such a manner that a first signature created by using a private key of the store device 4 is affixed, and the settlement management device 3 checks the first signature by using a public key corresponding to the private key of the store device 4.

The settlement information is created by the settlement management device 3 on the basis of the settlement request information transmitted from the store device 4 to the settlement management device 3, and includes various information for making settlement by increasing or decreasing value information stored in the data storage device 20 from the settlement management device 3 through the personal computer 22 as the client device and the reader/writer 21. The security of the settlement information is secured by the common key shared by the settlement management device 3 and the data storage device 20. Further, the validity of the settlement information is secured in such a manner that a second signature created by using a private key of the settlement management device 3 is affixed, and the personal computer 22 checks the second signature by using a public key corresponding to the private key of the settlement management device 3.

The settlement completion information is created after the settlement management device 3 confirms that the settlement is made by increasing or decreasing the value information stored in the data storage device 20, and is transmitted to the store device 4, and includes various information relating to settlement completion. The validity of the settlement completion information is secured in such a manner that a third signature created by using the private key of the settlement management device 3 is affixed, and the store device 4 checks the third signature by using the public key corresponding to the private key of the settlement management device 3.

The settlement completion receipt information is created after the store device 4 confirms that the settlement is completed on the basis of the data storage device 20 owned by the user, and is transmitted to the settlement management device 3 and the personal computer 22 as the client device, and by this, completion of the settlement is confirmed, and it becomes possible to deliver a commodity or service from the store device 4 to the user. The validity of the settlement completion receipt information is secured in such a manner that a fourth signature created by using the private key of the store device 4 is affixed, and the settlement management device 3 and the personal computer 22 as the client device check the fourth signature by using the public key corresponding to the private key of the store device 4.

The value update information is information for increasing or decreasing the value information stored in the data storage device 20 such as the IC card, and is inputted to the data storage device 20 from the settlement management device 3 through the personal computer 22 as the client device and the reader/writer 21. The security of the value update information is secured by the common key shared by the settlement management device 3 and the data storage device 20. Further, the validity of the value update information is secured in such a manner that a fifth signature created by using the private key of the settlement management device 3 is affixed, and the personal computer 22 as the client device checks the fifth signature by using the public key corresponding to the private key of the settlement management device 3.

In the electronic settlement system of this embodiment, as the electronic signature used for assuring the validity of information to be transmitted, the first signature to the fifth signature are used according to the kinds of the transmission side and the reception side.

The first signature is a signature which is created by the private key of the store device 4, is affixed to the settlement request information, and is checked by using the corresponding public key in the settlement management device.

The second signature is a signature which is created by the private key of the settlement management device 3, is affixed to the settlement information, and is checked by using the corresponding public key in the personal computer 22 as the client device.

The third signature is a signature which is created by the private key of the settlement management device 3, is affixed to the settlement completion information, and is checked by using the corresponding public key in the store device 4.

The fourth signature is a signature which is created by the private key of the store device 4, is affixed to the settlement completion receipt information, and is checked by using the corresponding public key in the settlement management device 3.

The fifth signature is a signature which is created by the private key of the settlement management device 3, is affixed to the value update information, and is checked by using the corresponding public key in the personal computer 22 as the client device.

Figure 8:
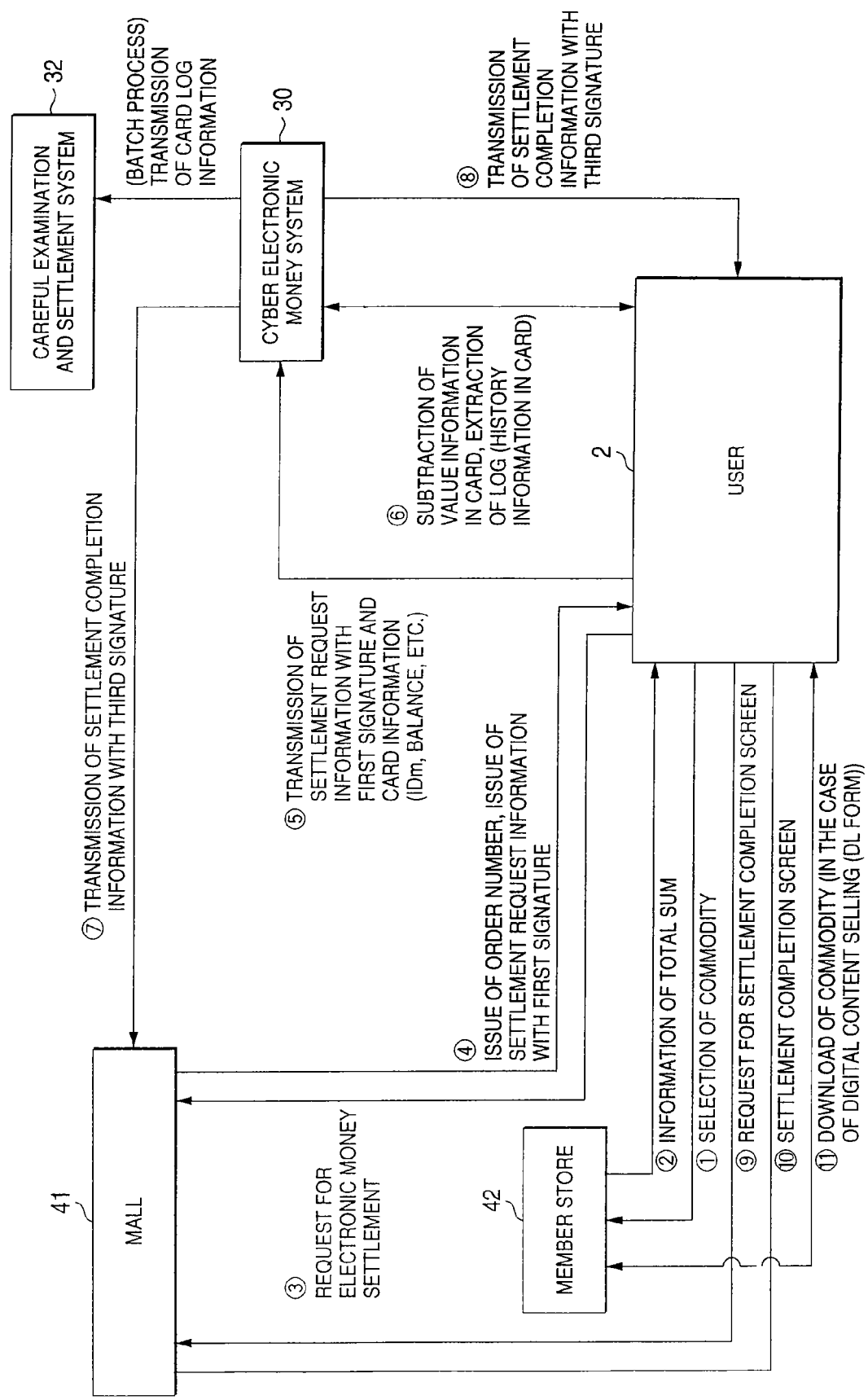
FIG. 8 is an explanatory view showing the flow of electronic money payment of an electronic settlement system according to an embodiment of the present invention.

Next, an electronic money payment operation in the settlement system of this embodiment will be described with reference to FIG. 8.

The user 2 accesses the network server 40 of the member store 42 through the personal computer 22, and selects a commodity or service which the user desires to purchase among commodities or services provided in the site ((1)).

The member store 42 transmits information relating to the total sum of the commodity or service selected by the user 2 ((2)).

The user 2 requests the mall 41 to which the member store 42 belongs to make settlement through electronic money by using the settlement system of this embodiment ((3)).

Receiving the electronic money settlement request from the user 2, the mall 41 issues an order number and issues the settlement request information with the first signature ((4)).

The user 2 transmits the settlement request information with the first signature transmitted from the mall 41 and card information (ID, balance, etc.) to the cyber electronic settlement system 30 ((5)).

The cyber electronic settlement system 30 receives the settlement request information with the first signature, communicates with the data storage device 20 owned by the user 2, transmits the settlement information with the second signature to the data storage device 20, decreases a value corresponding to the purchased commodity or service from the value information stored in the data storage device 20, and extracts the history information in the card ((6)).

After the settlement is completed, the cyber electronic settlement system 30 transmits the settlement completion information with the third signature to the mall 71 ((7)).

After the settlement is completed, the cyber electronic settlement system 30 transmits the settlement completion information with the third signature to the user 2 ((8)).

After confirming that the settlement is completed through the settlement completion information with the third signature, the user 2 requests a settlement completion screen to the member store 42 ((9)).

In response to the request for the settlement completion screen from the user 2, the member store 42 transmits the settlement completion receipt information with the fourth signature to the user 2 and the cyber electronic settlement system 30, and displays the settlement completion screen on the personal computer 22 of the user 2 ((10)).

After the settlement is completed through the above steps, the commodity or service is delivered from the member store 42 to the user 2. For example, in the case where the commodity is digital content, the member store 42 permits the user 2 to download the digital content, so that the delivery of the commodity is performed ((11)).

Next, a commodity information transmission sequence and a value information transmission sequence in the electronic settlement system of the embodiment using the common key, the public key and the electronic signature and having high security will be described in detail with reference to FIGS. 9 to 11.

Figure 9:
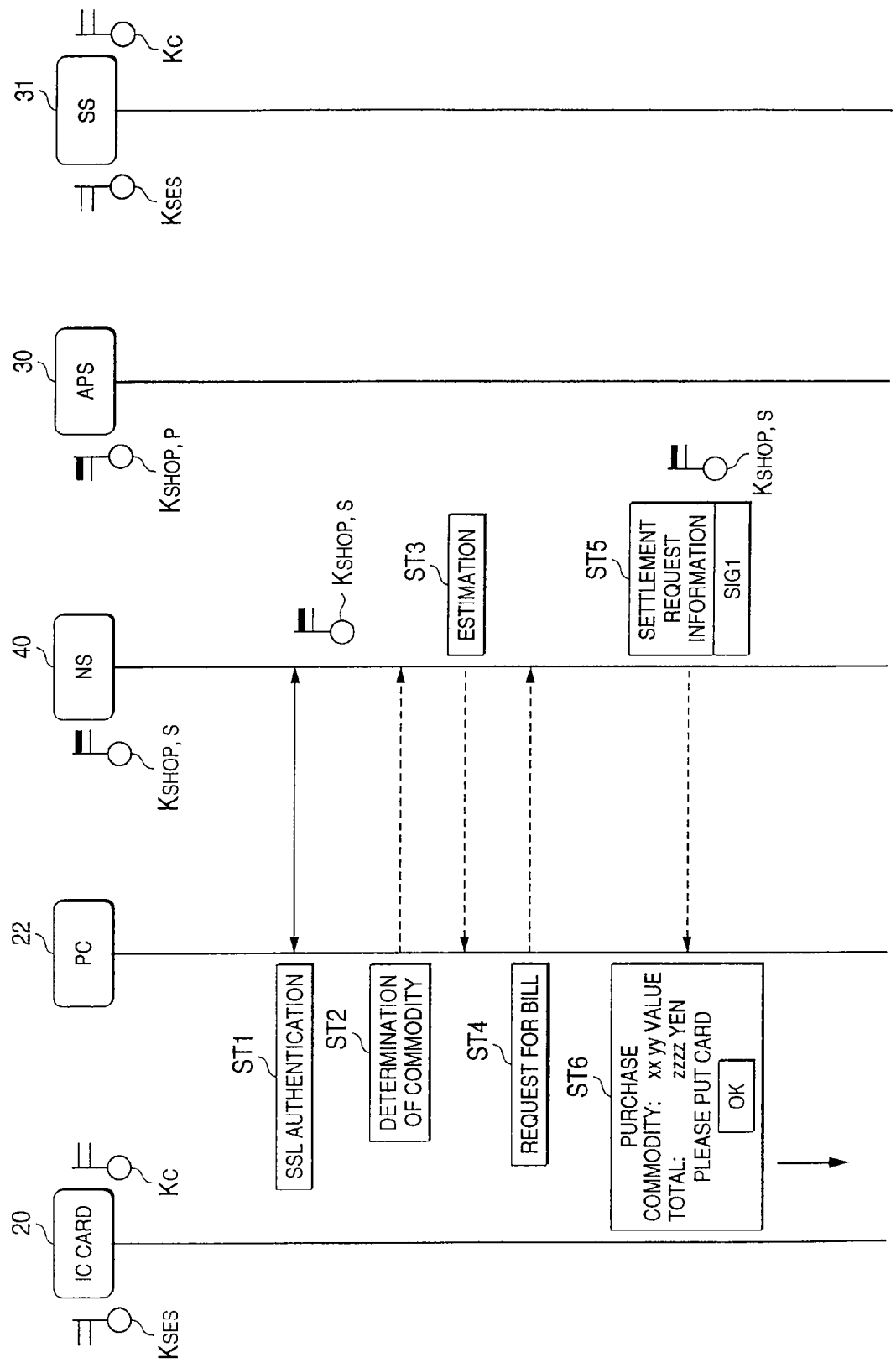
FIG. 9 is a view for explaining the operation of the electronic settlement system shown in FIG. 1 and shows a commodity information transmission sequence.

First, before commodity determination by the user is performed as shown in FIG. 9, the user 2 uses the browser program 23 operating on the personal computer 22 to access the network server 40 of the store device 4 through the network 5. By the access, commodity information provided by the store device 4 is transmitted from the network server 40 to the personal computer 22 through the network 5, and the screen corresponding to that is displayed on the display of the personal computer 22.

First Embodiment

Hereinafter, the operation of the electronic settlement system 1 will be described for respective steps of FIGS. 9 to 11. FIGS. 12 to 20 show examples of the screen display of the personal computer 22 of the client device.

In the operation described below, when transmission and reception of information or request is performed between the personal computer 22 of the client device and the network server 40, although signature information created by using a private key of a transmission source is checked by using a public key corresponding to the private key in a transmission destination, the description of the processing is omitted.

Besides, similarly, when transmission and reception of information or request is performed between the personal computer 22 and the application server 30, although electronic signature information created by using a private key of a transmission source is checked by using a public key corresponding to the private key in a transmission destination, the description of the processing is omitted except for steps ST14 and ST15.

Step ST1 F

Server authentication or mutual authentication using SSL (Secure Socket Layer) is performed between the personal computer 22 and the network server 40, and a secure communication path is established.

Step ST2

On a commodity selection screen as shown in FIG. 12, when the user 2 operates a keyboard or a mouse of the personal computer 22 to determine a commodity which the user desires to purchase, commodity determination information corresponding to that is transmitted from the personal computer 22 to the network server 40.

Step ST3

When receiving the commodity determination information from the personal computer 22, the network server 40 transmits estimation information to the personal computer 22.

Step ST4

As shown in FIG. 13, the personal computer 22 displays the estimation information received from the network server 40 on the display. In the case where the user 2 agrees to the estimation, a payment method is selected on the screen shown in FIG. 14. When the user 2 selects a settlement using electronic money by operating the keyboard of the personal computer 22, a bill request is transmitted to the network server 40.

Step ST5

When receiving the bill request from the personal computer 22, the network server 40 transmits settlement request information indicating the sum which the store device 4 charges the user 2, first signature information SIG1 created by using a private key KSHOP,S of the store device 4 with respect to the settlement request information, and the interface program 24 to the personal computer 22.

Step ST6

Figure 15:
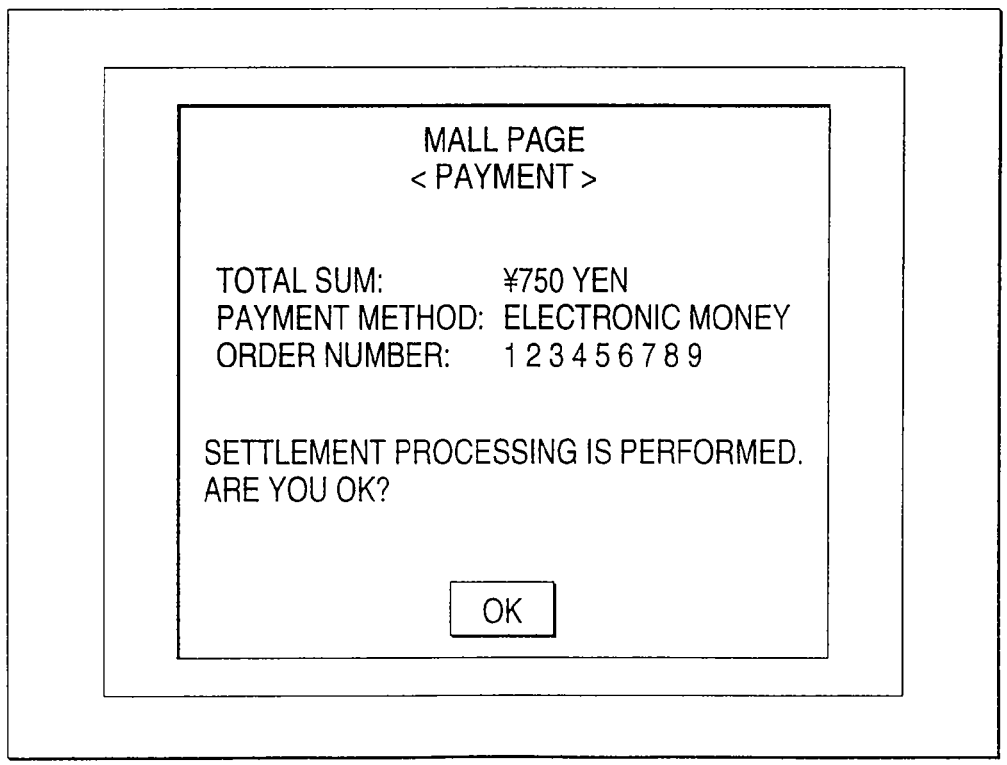
FIG. 15 is a view of a screen constitution example displayed in the client device during the settlement operation of the electronic settlement system shown in FIG. 1.

As shown in FIG. 15, the personal computer 22 displays the sum indicated by the settlement request information received from the network server 40 at the step ST5 on the display.

Step ST7

When the user who agrees to the sum displayed on the display at the step ST6 issues a predetermined instruction by using the keyboard or the like of the personal computer 22, the interface program 24 received from the network server 40 at the step ST5 is started.

Figure 16:
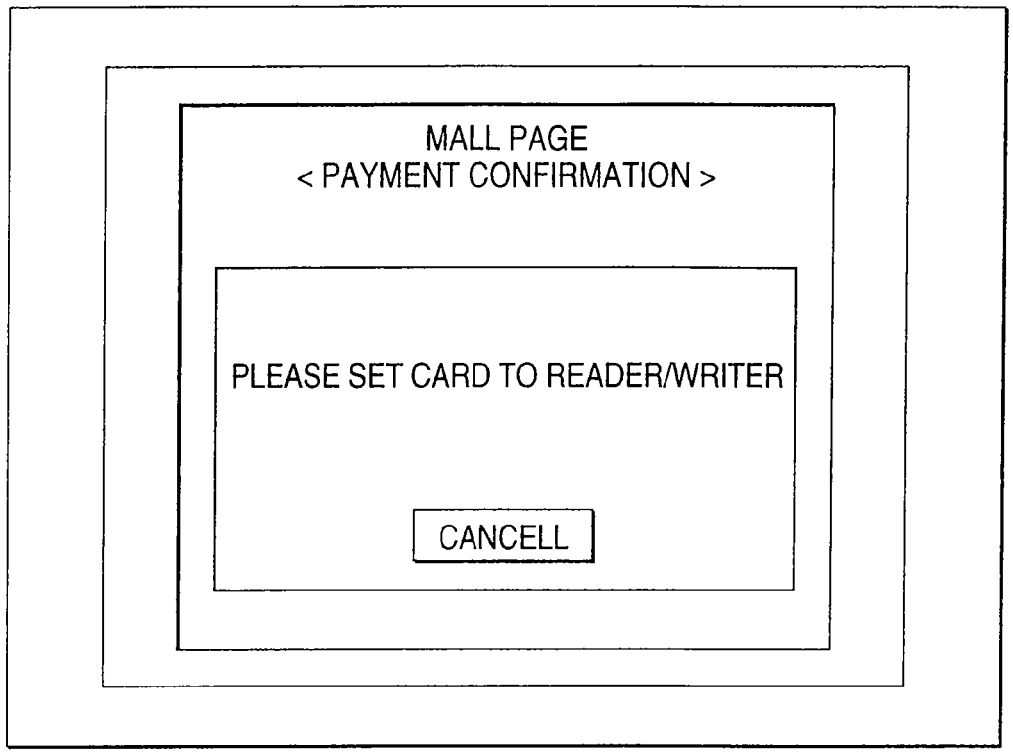
FIG. 16 is a view of a screen constitution example displayed in the client device during the settlement operation of the electronic settlement system shown in FIG. 1.

When the user 2 puts the data storage device 20 such as the IC card to the reader/writer 21 in accordance with a screen display as shown in FIG. 16, the personal computer 22 uses the started interface program 24 to perform server authentication or mutual authentication using the SSL to the application server 30 of the settlement management device 3, and establishes a secure communication path.

Figure 17:
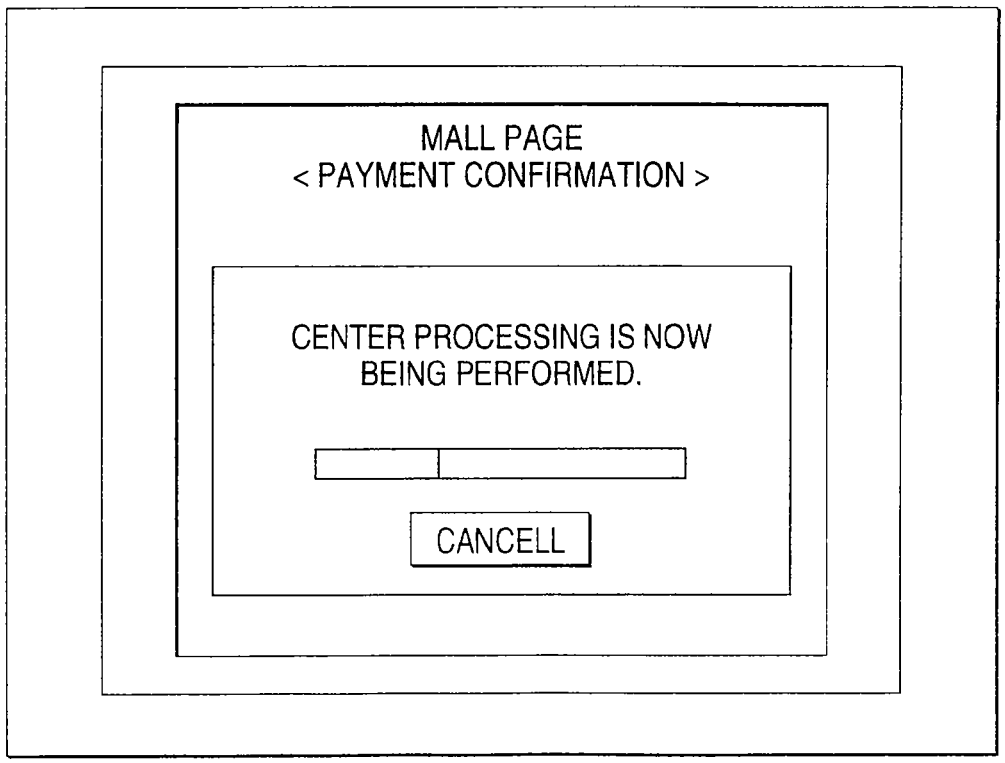
FIG. 17 is a view of a screen constitution example displayed in the client device during the settlement operation of the electronic settlement system shown in FIG. 1.

In the settlement system of this embodiment, when the settlement processing is performed, a screen to urge the user to wait as shown in FIG. 17 is displayed on the display of the personal computer 22.

Step ST8

The personal computer 22 transmits the settlement request information received from the network server 40 of the store device 4 at the step ST5, and the settlement request information including the first signature information SIG1 with respect to the settlement request information to the application server 30 of the settlement management device 3.

Step ST9

When the application 30 checks the first signature information SIG1 received at the step ST8 by using, for example, a public key KSHOP,P read out from the information management server 32 and corresponding to the private key of the store device 4, and judges that the first signature information SIG1 is a valid one affixed in the network server 40 of the store device 4, the processing of step ST10 is performed.

In the case where the application server 30 judges that the first signature information SIG1 is false, the application server ends the processing after, for example, it notifies the personal computer 22 of that.

Step ST10

Next, the application server 30 of the settlement management device 3 transmits, for example, settlement request information to the security server 31.

Step ST11

When receiving the settlement request information from the application server 31, the security server 31 performs mutual authentication to the data storage device 20, and creates a session key KSES from a common key KC shared by the data storage device 20. Similarly, the data storage device 20 also creates the session key KSES from the common key KC.

Step ST12

The security server 31 creates settlement information, encrypts this by the session key KSES, and outputs it to the application server 30. At that time, the security server 31 affixes a second signature created by using the private key of the settlement management device.

The application server 30 transmits the settlement information including balance readout request (BRC) inputted from the security server 31 to the personal computer 22.

The personal computer 22 outputs the settlement information including the balance readout request BRC received from the application server 30 to the data storage device 20 through the reader/writer 21.

Step ST13

When the settlement information including the balance readout request BRC from the personal computer 22 is inputted, the data storage device 20 decrypts this by using the session key KSES created at the step ST11.

The data storage device 20 reads out the settlement information including balance information BI from the tamper-resistant memory 52 in the data storage device 20 by processing of the processing circuit 51 in accordance with the settlement information including the balance readout request BRC, and after encrypting this by using the session key KSES, the data storage device outputs it to the personal computer 22.

The personal computer 22 transmits the settlement information including the balance information BI from the data storage device 20 to the application server 30.

The application server 30 outputs the balance information BI received from the personal computer 22 to the security server 31.

The security server 31 decrypts the settlement information including the balance information BI inputted from the application server 30 and creates log information.

Step ST14

The security server 31 creates settlement processing request SPC including log writing information for writing the log information created at the step ST13 into the data storage device 20 and subtraction information indicating a subtraction sum for subtracting a bill from a sum indicated by the balance information stored in the data storage device 20, and encrypts it by using the session key KSES.

Next, the security server 31 outputs the plain text balance information BI and the settlement information including the encrypted settlement processing request SPC to the application server 30.

The application server 30 creates second signature information with respect to the balance information inputted from the security server 31 and the settlement information including the settlement processing request SPC by using a private key of the application server 30.

Next, the application server 30 affixes the second signature information to the settlement information including the balance information BI and the settlement processing request SPC and inputted from the security server 31, and transmits it to the personal computer 22.

Step ST15

The personal computer 22 checks the validity of the second signature information SIG2 received from the application server 30 by using the public key of the application server 30, and after the validity is recognized, processing described below is carried out.

Figure 18:
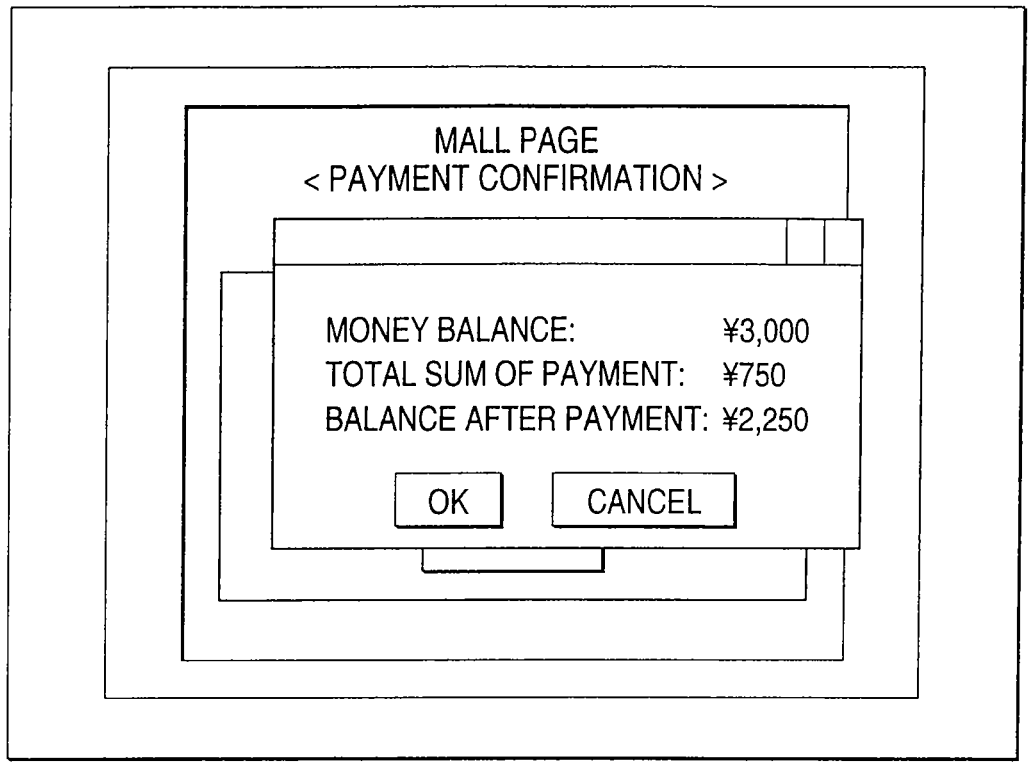
FIG. 18 is a view of a screen constitution example displayed in the client device during the settlement operation of the electronic settlement system shown in FIG. 1.

As shown in FIG. 18, the personal computer 22 displays the balance indicated by the balance information BI received from the application server 30, and the sum (bill) indicated by the estimation information received from the network server 40 at the step ST3 on the display.

Step ST16

Figure 19:
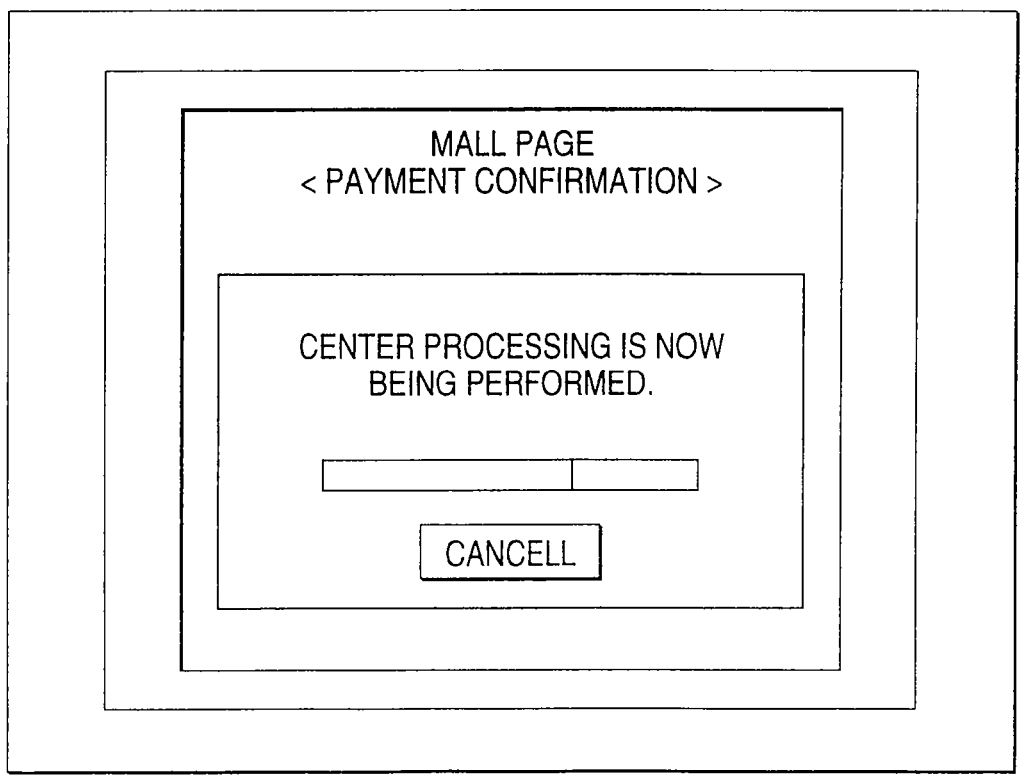
FIG. 19 is a view of a screen constitution example displayed in the client device during the settlement operation of the electronic settlement system shown in FIG. 1.

When the user 2 agrees to the balance and the bill displayed on the display at the step ST15 and issues a predetermined instruction by using the keyboard or the like of the personal computer 22, the personal computer 22 outputs the settlement processing request SPC to the data storage device 20 through the data storage device reader/writer 21. During a period when payment confirmation processing is carried out, a screen urging a wait as shown in FIG. 19 is displayed on the display of the personal computer 22.

Step ST17

The data storage device 20 decrypts the settlement processing request SPC inputted from the personal computer 22 by using the session key KSES, and a settlement processing corresponding to the settlement processing request is executed in the processing circuit 51.

Specifically, the data storage device 20 stores the log writing information included in the settlement processing request SPC by the processing of the processing circuit 51 into the tamper-resistant memory 52 in the data storage device 20. Besides, by the processing of the processing circuit 51, the data storage device 20 subtracts the subtraction sum indicated by the subtraction information included in the settlement processing request SPC from the balance indicated by the balance information stored in the memory 52, and stores the result as balance information into the memory 52.

Step ST18

When the processing of the step ST17 is completed, the data storage device 20 creates processing completion notification PCN indicating completion of the processing, and after encrypting this by the session key KSES, the data storage device transmits it to the security server 31 through the personal computer 22 and the application server 30.

Step ST19

When receiving the processing completion notification PCN from the data storage device 20, the security server 31 decrypts this by using the session key KSES, and after confirming the processing completion notification PCN, the security server creates settlement completion information ACN, and transmits it through the application server 30 to the personal computer 22 and the network server 40. At that time, the validity of the settlement completion information is secured by affixing a third signature created by the settlement management device.

Step ST20

Figure 20:
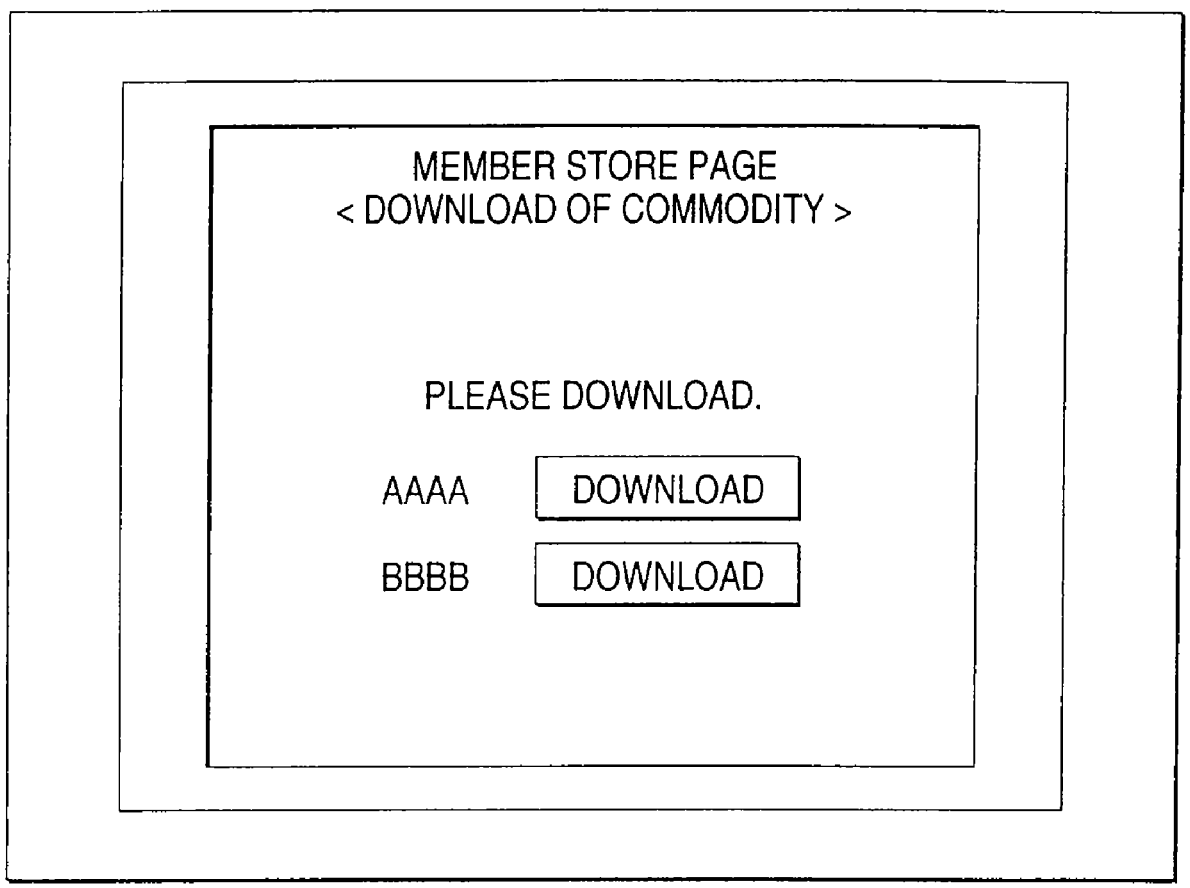
FIG. 20 is a view of a screen constitution example displayed in the client device during the settlement operation of the electronic settlement system shown in FIG. 1.

When receiving the settlement completion notification ACN from the security server 31, the personal computer 22 displays information corresponding to this, for example, a screen urging download of digital content on the display as shown in FIG. 20.

As described above, according to the electronic settlement system 1, the common key KC is stored in the memory 52 of the data storage device 20 such as the IC card, and the private key is not stored. Thus, even in the case where the user 2 lost the data storage device 20, since the private key is not stored in the memory 52, it is possible to prevent signature of the user 2 from being dishonestly put by using the private key.

Besides, according to the electronic settlement system 1, since the common key KC is used only in the inside of the data storage device 20 and the security server 31, it is possible to reduce the fear that the common key KC is stolen, and safe transactions can be realized, and further, key management can be made easy.

Besides, according to the electronic settlement system 1, the input and output of the information and request to the data storage device 20 such as the IC card is carried out through the personal computer 22, and the signature check using the private key and the public key is carried out when the information and request is transmitted and received between the personal computer 22 and the application server 30 or the network server 40, so that it is possible to prevent the information and request from being dishonestly falsified on the network 5, and safety of transactions using the network 5 can be secured.

Besides, according to the electronic settlement system 1, in the network server 40 of the store device 4, the signature information SIG created by using its own private key KSHOP,S is affixed to the bill information BILL, and in the application server 30 of the settlement management device 3, the signature information SIG is checked by using the public key KSHOP,P corresponding to the private key KSHOP,S, and it is judged that the signature information SIG is a valid one affixed in the network server 40 of the store device 4, so that it is possible to prevent the settlement from being made on the basis of the dishonestly falsified bill information BILL in the personal computer 22 of the user 2 or the like.

Besides, in the electronic settlement system 1, as described above, the personal computer 22 displays the balance indicated by the balance information BI received from the application server 30 and the sum (bill) indicated by the estimate information received from the network server 40 on the display, and after the user 2 agrees to the content, the settlement processing request SPC received from the application server 30 is outputted through the data storage device reader/writer 21 to the data storage device 20. Accordingly, the user 2 can previously confirm the content of settlement processing finally performed in the data storage device 20, and it is possible to prevent the settlement processing from being performed on the basis of dishonestly falsified content.

Besides, according to the electronic settlement system 1, the procedures accompanying the settlement processing can be lessened as compared with the prior art, information transmission through the network 5 can be reduced, the amount of use of the network 5 can be reduced, and the processing time can be shortened.

Besides, according to the electronic settlement system 1, contrary to the conventional SET system, it is not necessary to carry out creation and check of signature information many times.

Second Embodiment

Figure 21:
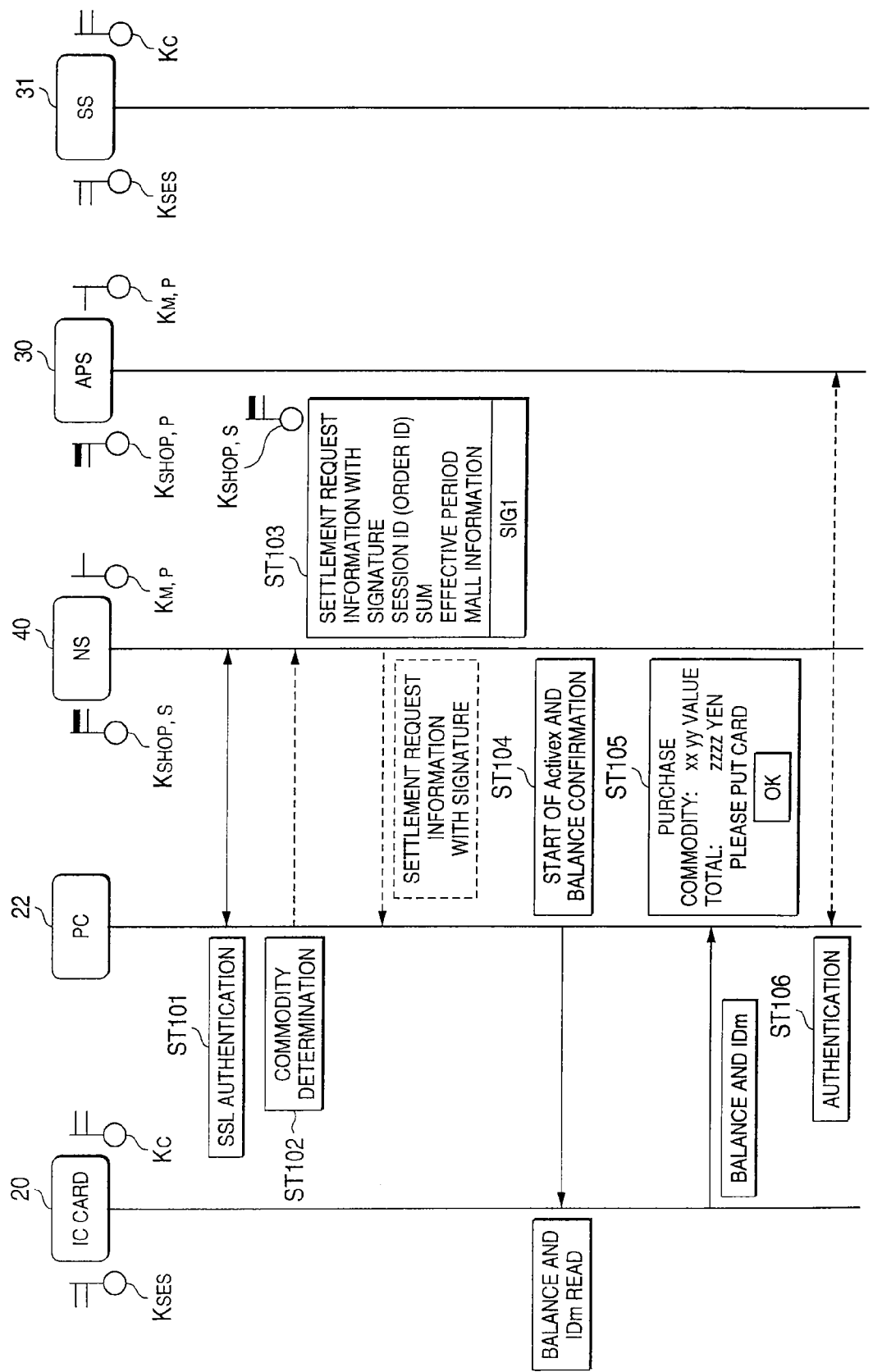
FIG. 21 is a view for explaining the operation of the electronic settlement system shown in FIG. 1 and shows a commodity information transmission sequence.
Figure 22:
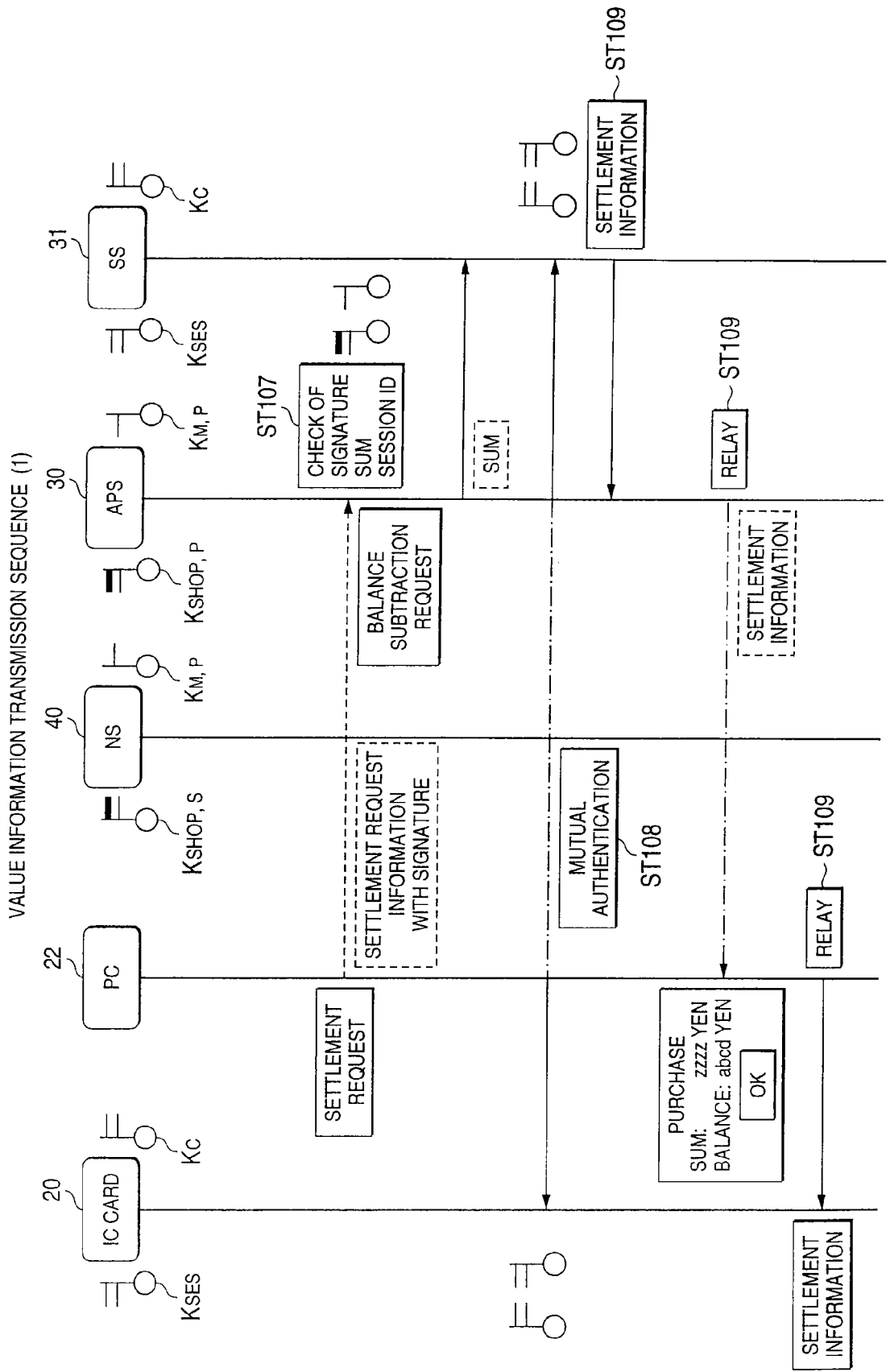
FIG. 22 is a view for explaining the operation of the electronic settlement system shown in FIG. 1 and shows a value information transmission sequence.
Figure 23:
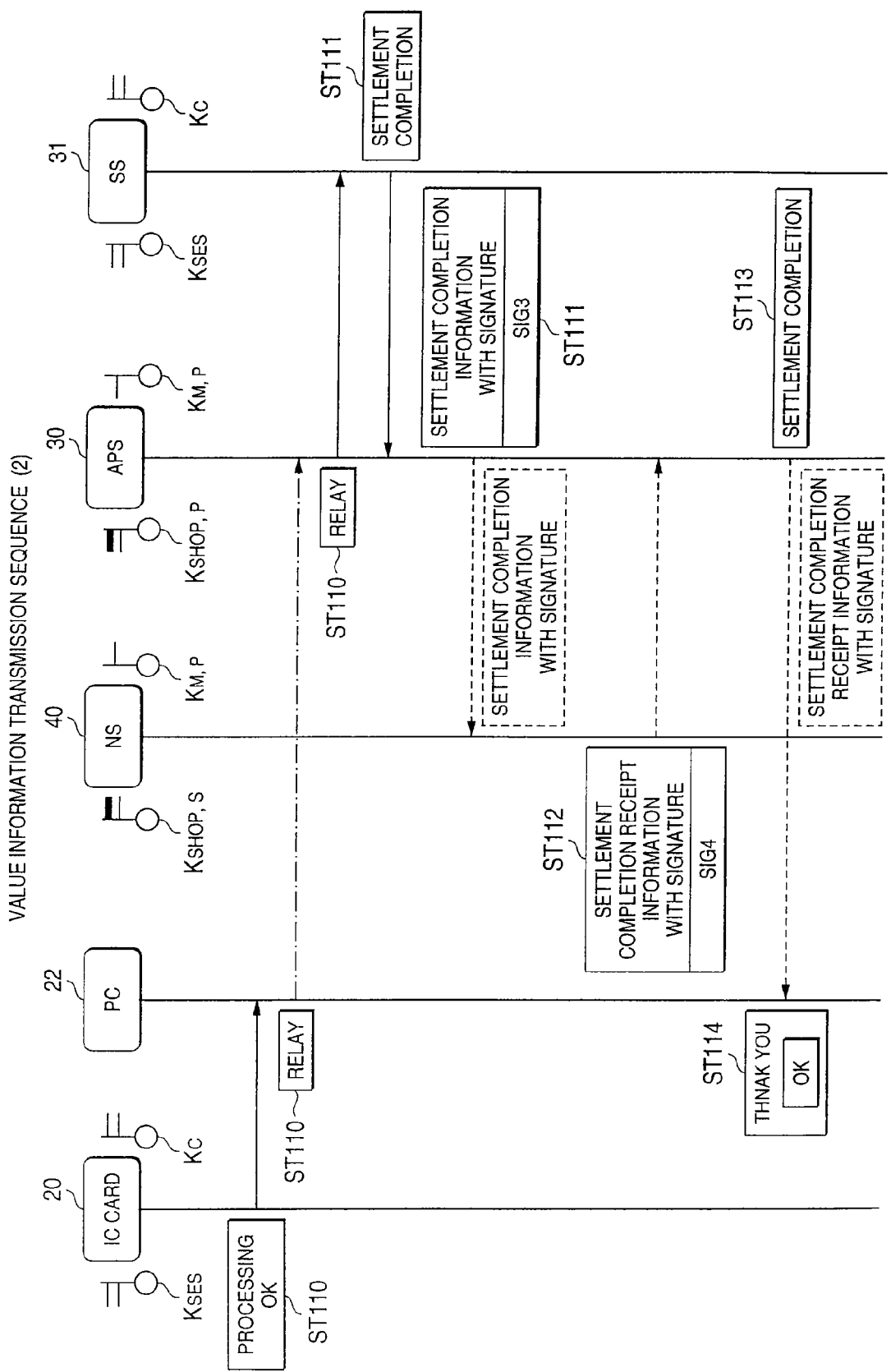
FIG. 23 is a view for explaining the operation of the electronic settlement system shown in FIG. 1 and shows the value information transmission sequence.
Figure 24:
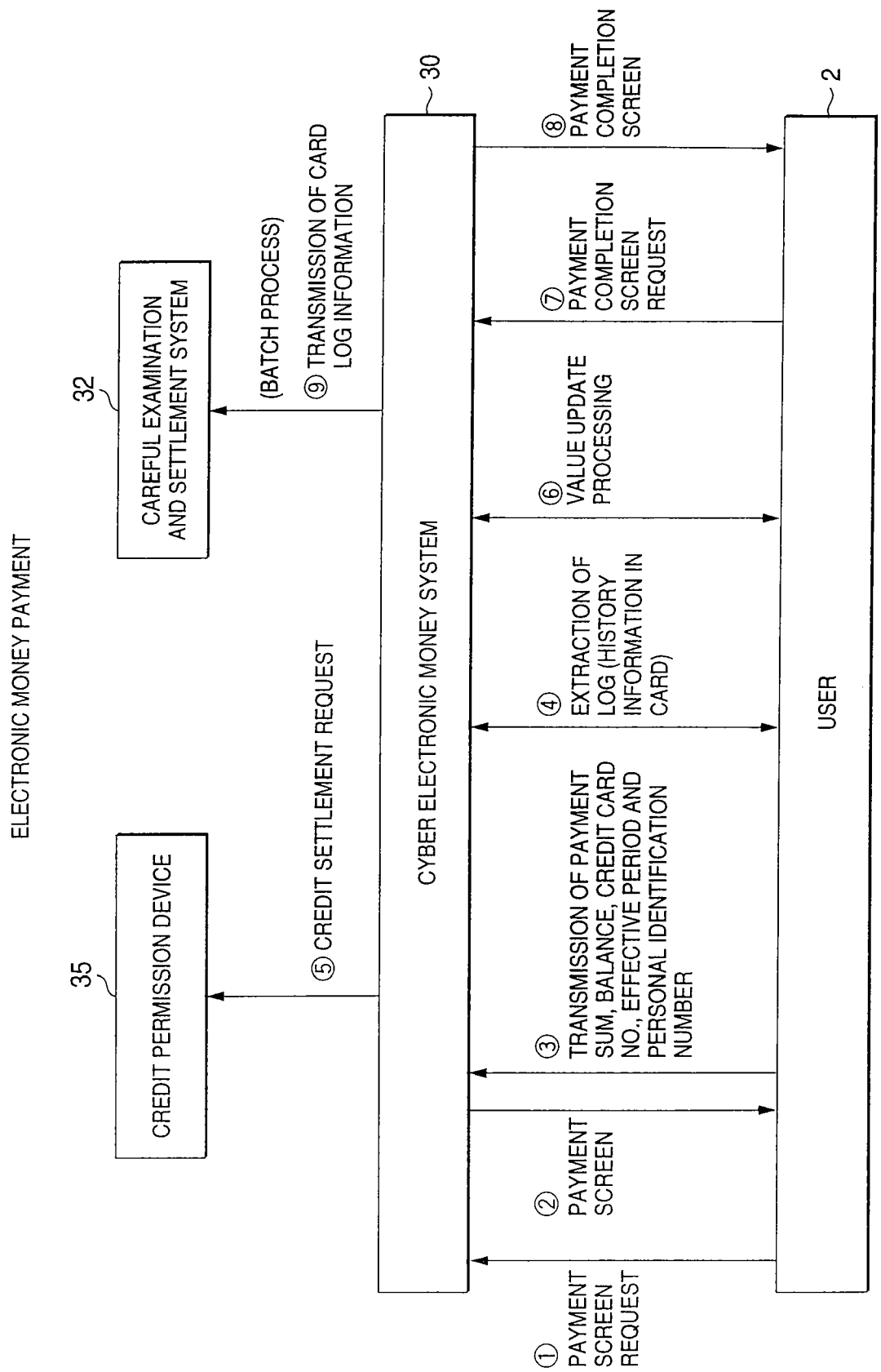
FIG. 24 is an explanatory view showing the flow of electronic money payment of an electronic settlement system according to an embodiment of the present invention.

Next, a commodity information transmission sequence and a value information transmission sequence according to a settlement system of another embodiment will be described with reference to FIGS. 21 to 23.

ST101

First, SSL authentication for high security communication is established between the personal computer 22 of the user 2 and the store device 4.

ST102

Next, the user 2 selects a commodity in accordance with a screen displayed on the display of the personal computer 22.

ST103

In accordance with the commodity selected by the user 2, the network server 40 of the store device 4 transmits settlement processing request information with a first signature created by using a private key of the store device 4 to the personal computer 22 of the user 2.

ST104

The personal computer 22 starts the interface program 24 such as the ActiveX, accesses the data storage device 20 such as the IC card through the reader/writer 21, and reads out the balance of the data storage device.

ST10

The read balance is taken in the personal computer 22 of the user 2 by using a predetermined browser mechanism, and is displayed on the display.

ST106

Next, secure SSL authentication is established between the personal computer 22 of the user 2 and the application server 30 of the settlement management device 3, and preparations are made for the value information transmission sequence.

ST107

Next, settlement request information given the first signature and including balance information of the data storage device 20 is transmitted from the personal computer 22 of the user 2 to the settlement management device 3.

The application server 30 of the settlement management device 3 checks the validity of the transmitted settlement request information by a publication key corresponding to the private key of the store device 4, and delivers necessary information to the security server 31.

ST108

The security server 31 of the settlement management device 3 performs mutual authentication to the data storage device 20, and creates a session key from a common key. Similarly, the data storage device 20 also performs mutual authentication to the security server 31, and creates the session key from the common key.

ST109

The security server 31 encrypts settlement information by the session key, and transmits it to the personal computer 22 of the user 2 through the application server 30.

The personal computer 22 decrypts the transmitted settlement information by the session key stored in the data storage device 20 and carries out a screen display. In the case where the user agrees to the transmitted settlement information, the content is transmitted to the data storage device 20 through the reader/writer 21, and a predetermined settlement processing such as a subtraction processing is performed in the data storage device 20.

Figure 10:
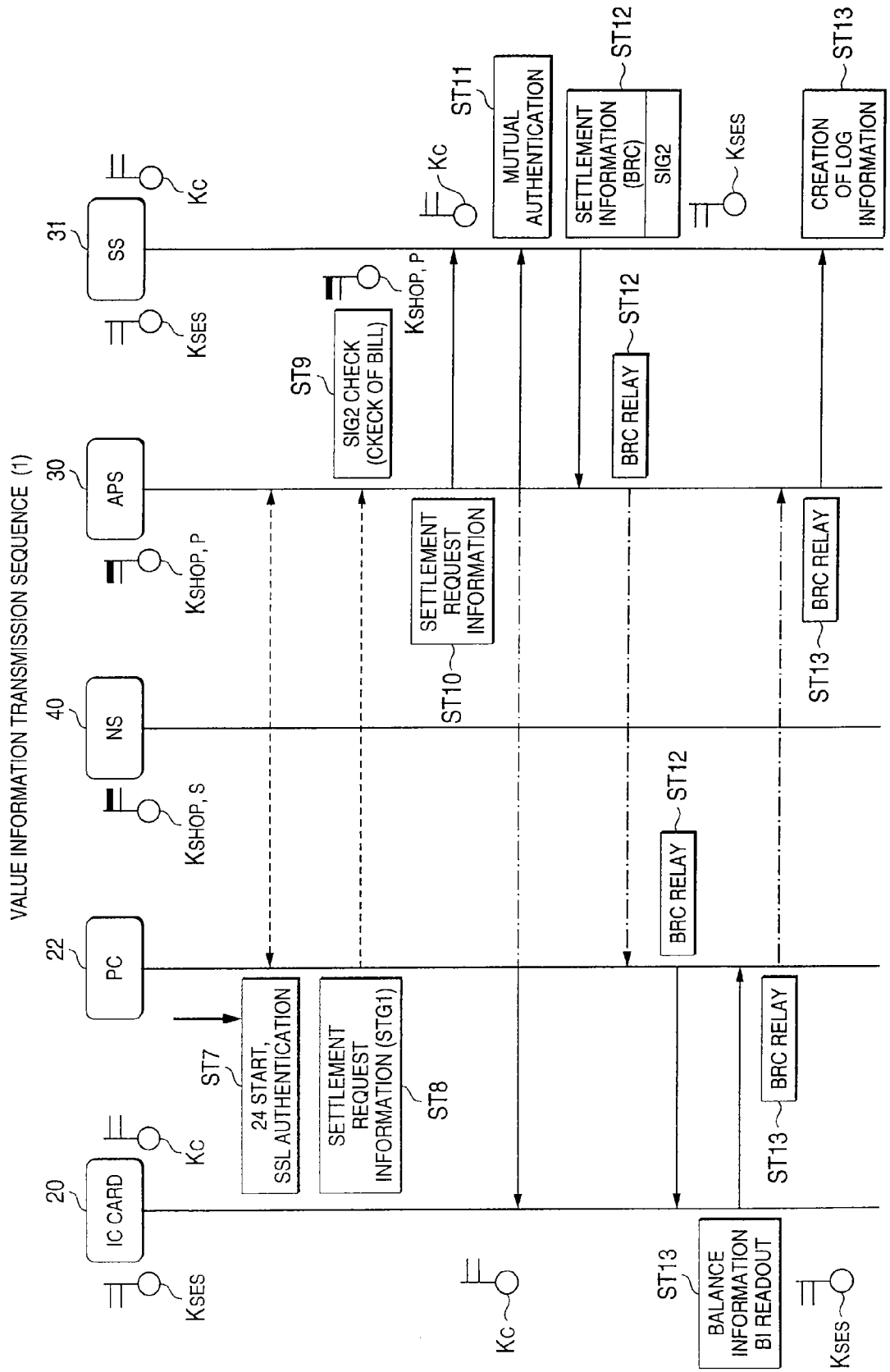
FIG. 10 is a view for explaining the operation of the electronic settlement system shown in FIG. 1 and shows a value information transmission sequence.
Figure 11:
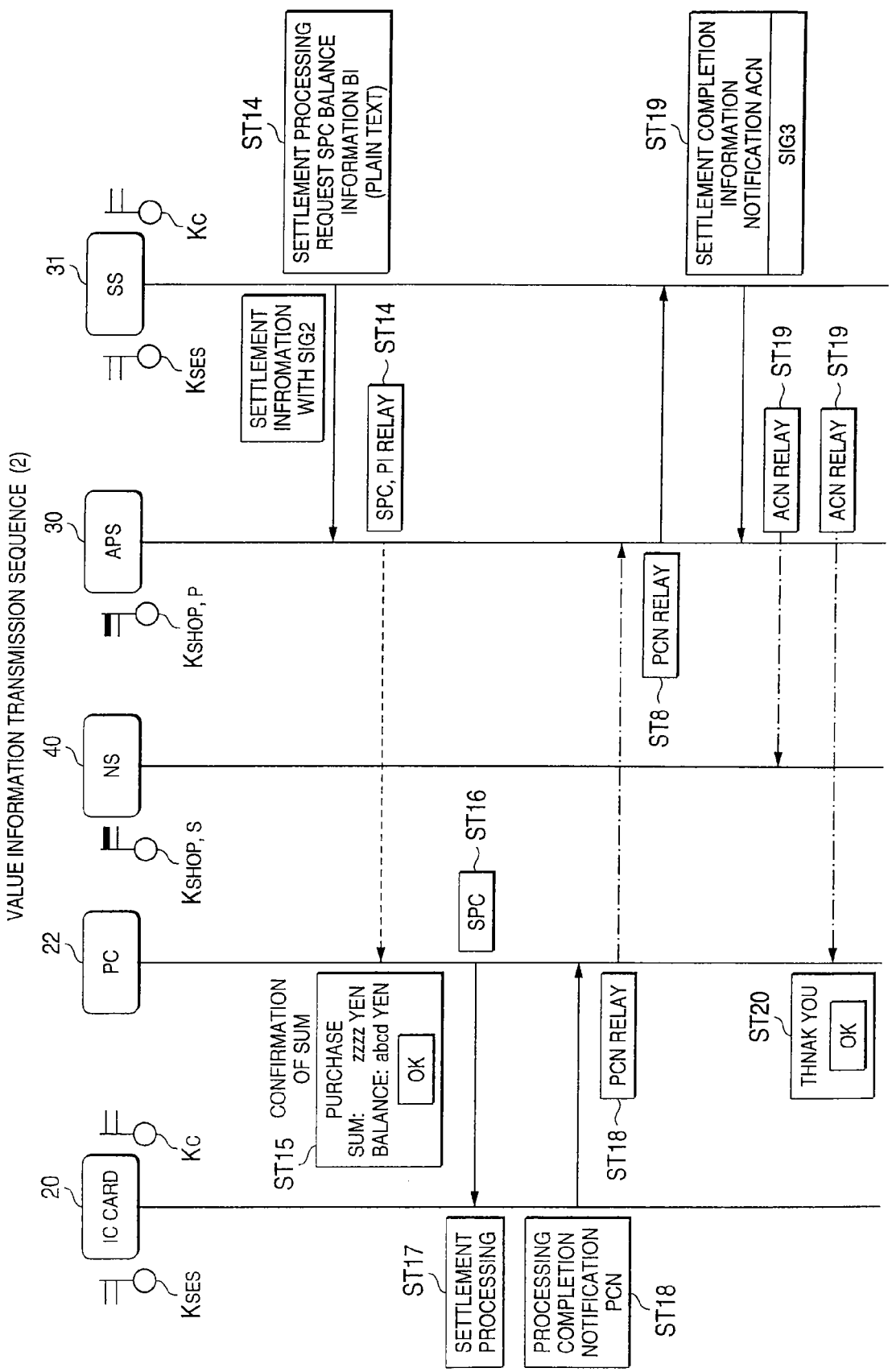
FIG. 11 is a view for explaining the operation of the electronic settlement system shown in FIG. 1 and shows the value information transmission sequence.
Figure 14:
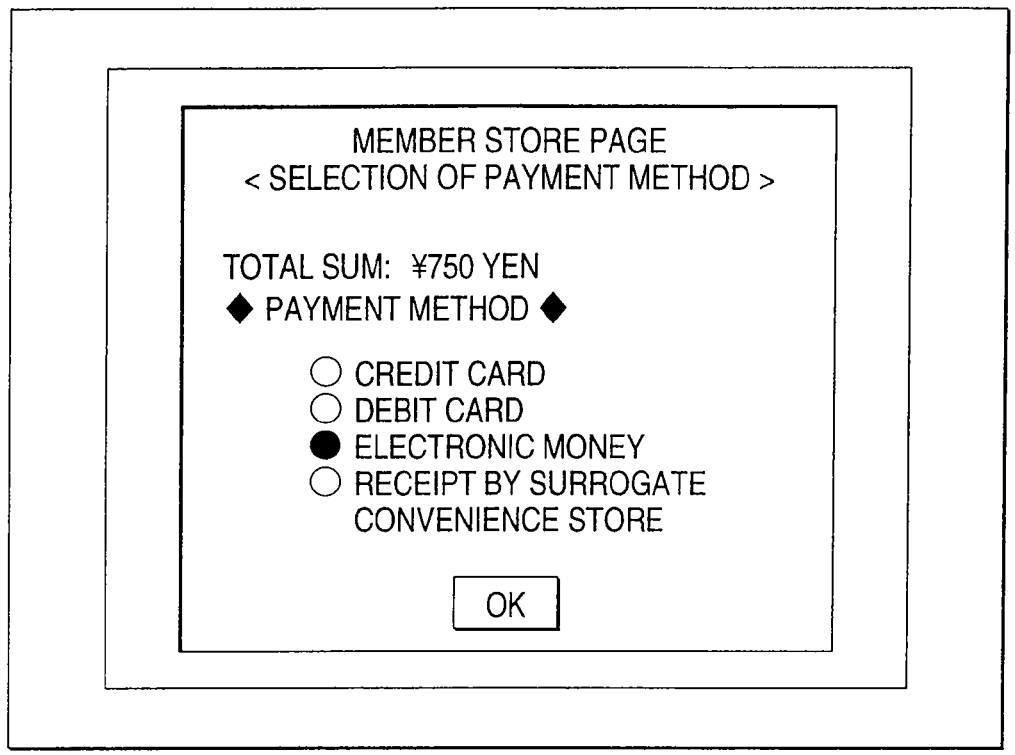
FIG. 14 is a view of a screen constitution example displayed in the client device during the settlement operation of the electronic settlement system shown in FIG. 1.

Incidentally, attention should be paid to the point that in the settlement sequence of this embodiment, contrary to the settlement sequence described in relation to FIGS. 9 to 11, the settlement information created by the security server 31 of the settlement management device 3 is only encrypted by the common key, and a second signature created by using a private key owned by the settlement management device 3 is not affixed.

Like this, since the origin of the transmitted settlement information can also be confirmed merely by encryption/decryption using the common key, the redundancy of processing can be relieved by omitting the second signature as in the settlement system of this embodiment.

ST110

As described above, when the predetermined settlement processing is ended in the data storage device 20, the result is transmitted to the security server 31 through the reader/writer 21, the personal computer 22, and the application server 30.

ST111

When settlement completion is confirmed by the security server 31, settlement completion information is transmitted to the application server 30. The settlement completion information (receipt) is given a third signature created by using the private key of the settlement management device 3 in the application server 31 and is transmitted to the network server 40 of the store device 2.

ST112

The network server 40 checks the settlement completion information by the public key corresponding to the private key of the settlement management device 3, and after the content is confirmed, settlement completion receipt information is created. The settlement completion receipt information is given a fourth signature created by using the private key of the store device 4 and is transmitted to the application server 30 of the settlement management device 3.

The application server 30 of the settlement management device 3 transmits the settlement completion receipt information with the fourth signature to the personal computer 22 of the user 2, so that the display of the personal computer 22 indicates that the series of electronic money settlement processings have been completed.

As described above, according to the electronic settlement system of this embodiment, the common key KC is stored in the memory 52 of the data storage device 20, and the private key is not stored. Thus, even in the case where the user 2 lost the data storage device 20, since the private key is not stored in the memory 52, it is possible to prevent signature of the user 2 from being dishonestly put by using the private key.

Besides, according to the electronic settlement system of this embodiment, since the common key is used only in the inside of the data storage device 20 and the security server 31, it is possible to reduce the fear that the common key is stolen, and safe transactions can be realized, and further, key management can be made easy.

Besides, according to the electronic settlement system of this embodiment, the input and output of information and request to the data storage device 20 such as the IC card is carried out through the personal computer 22, and signature check using the private key and the public key is carried out when the information and request is transmitted and received between the personal computer 22 and the application server 30 or the network server 40, so that it is possible to prevent the information and request from being dishonestly falsified on the network 5, and safety of transactions using the network 5 can be secured.

Even in the case where the signature check is not carried out, since the origin of the transmitted settlement information can be confirmed by encryption/decryption using the common key, the redundancy of processing can be relieved as in the settlement system of this embodiment.

Besides, according to the electronic settlement system of this embodiment, in the network server 40 of the store device 4, the first signature information created by using its own private key is affixed to the settlement request information, and in the application server 30 of the settlement management device 3, the first signature information is checked by using the public key corresponding to the private key, and it is judged that the first signature information is a valid one affixed in the network server 40 of the store device 4. Thus, it is possible to prevent settlement from being made on the basis of dishonestly falsified settlement request information in the personal computer 22 of the user 2 or the like.

Besides, in the electronic settlement system of this embodiment, as described above, the personal computer 22 displays the balance indicated by the balance information received from the application server 30 and the sum (bill) indicated by the estimate information received from the network server 40 on the display, and after the user 2 agrees to the content, the settlement processing request SPC received from the application server 30 is outputted through the data storage device reader/writer 21 to the data storage device 20. Accordingly, the user 2 can previously confirm the content of the settlement processing finally performed in the data storage device 20, and it is possible to prevent the settlement processing from being performed on the basis of dishonestly falsified content.

Besides, according to the electronic settlement system 1, the procedures accompanying the settlement processing can be lessened as compared with the prior art, information transmission through the network 5 can be reduced, the amount of use of the network 5 can be reduced, and the processing time can be shortened.

Besides, according to the electronic settlement system 1, contrary to the conventional SET system, it is not necessary to carry out creation and check of signature information many times, so that the redundancy of the processing steps can be relieved.

Electronic Money Payment System

An electronic money payment system and sequence in the settlement system of this embodiment will be described with reference to FIGS. 24 to 31.

In the settlement system of this embodiment, although the data storage device 20 such as the IC card is used as electronic money of a prepaid system, in the case where the balance of the value information stored in the data storage device 20 is insufficient, it is necessary for the user 2 to update the value information to increase the balance. Alternatively, according to circumstances, it is necessary to update the value information to decrease the value information stored in the data storage device 20.

When electronic money is paid into the data storage device, the user 2 accesses the application server (cyber electronic money system) 30 of the settlement management device 3 through the personal computer 20 which can access the data storage device 20 through the reader/writer 21, and requests that a payment screen is displayed on the display ((1)).

Figure 25:
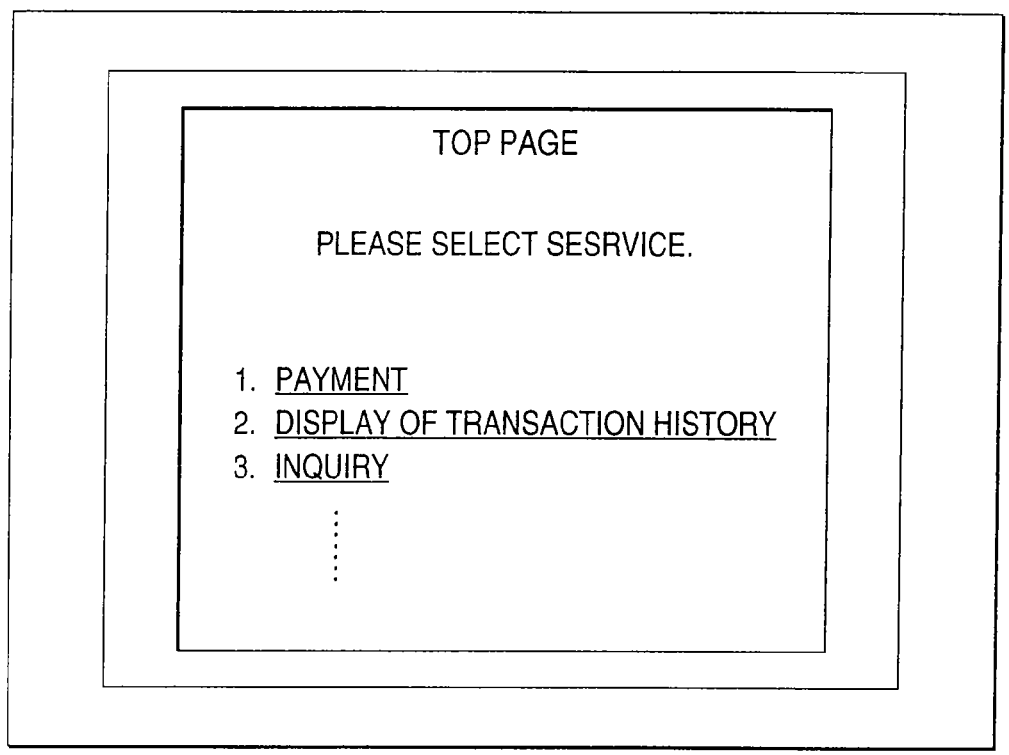
FIG. 25 is a view of a screen constitution example displayed in a client device during an payment operation of the electronic settlement system shown in FIG. 1.

Receiving the payment screen request, the application server 30 displays the payment screen as shown in FIG. 25 on the display of the personal computer 20 of the user 2 through the predetermined interface program 24 such as the ActiveX component ((2)).

Figure 26:
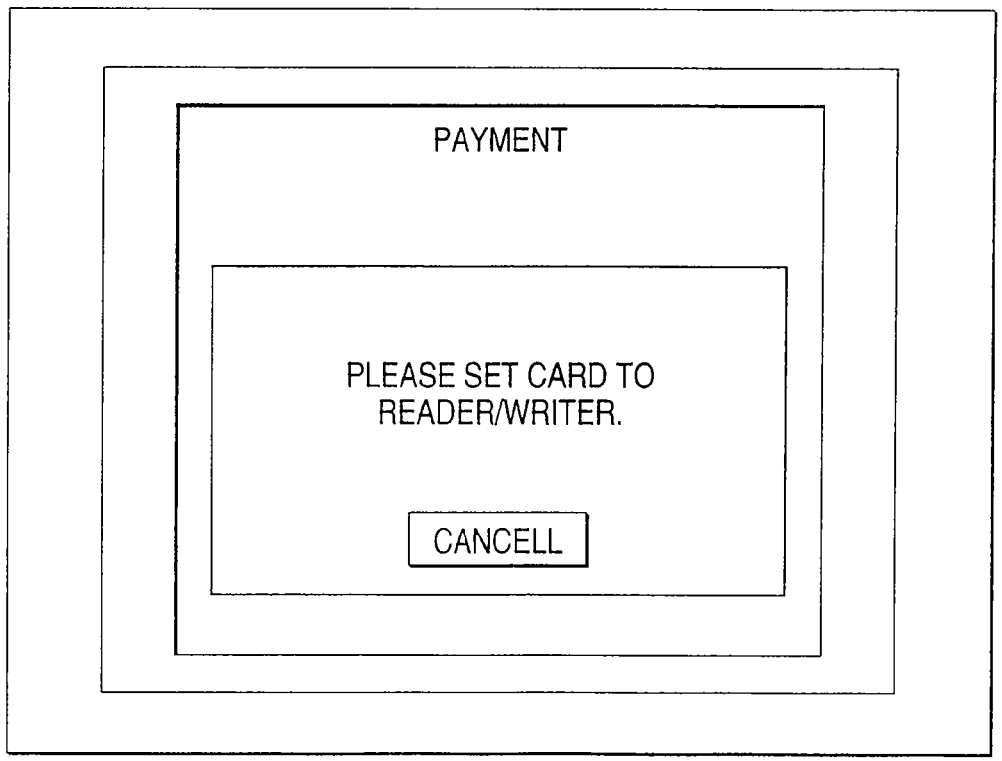
FIG. 26 is a view of a screen constitution example displayed in the client device during the payment operation of the electronic settlement system shown in FIG. 1.
Figure 27:
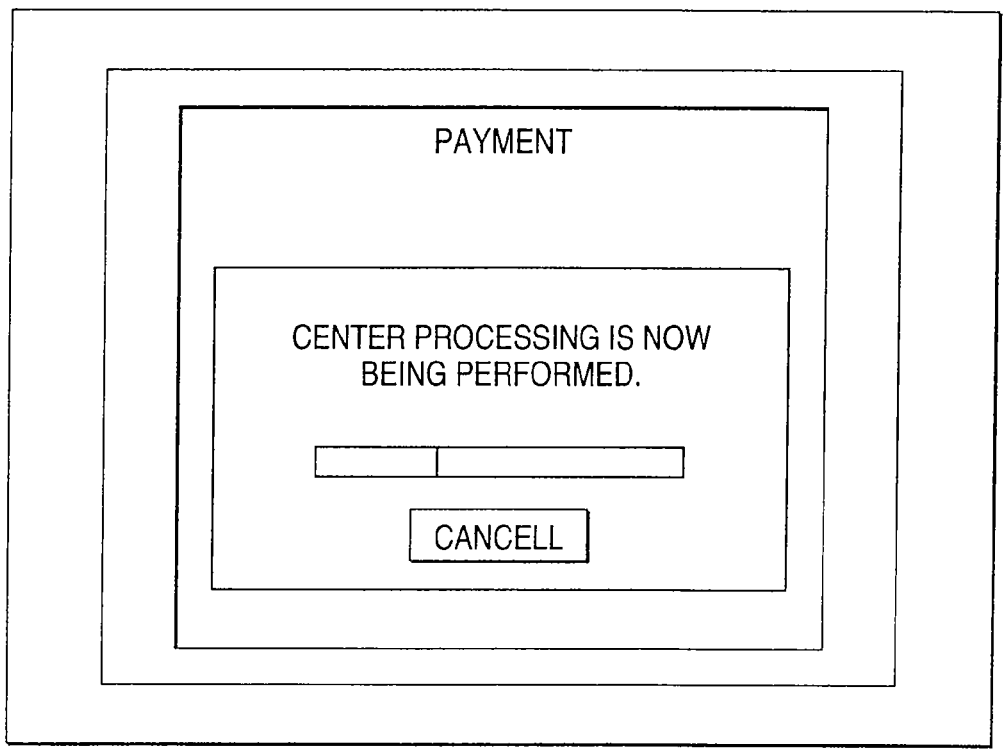
FIG. 27 is a view of a screen constitution example displayed in the client device during the payment operation of the electronic settlement system shown in FIG. 1.

When the user 2 selects payment in the payment screen shown in FIG. 25, an instruction to set the data storage device 20 to the reader/writer 21 is issued as shown in FIG. 26.

When the user 2 sets the data storage device 20 to the reader/writer 21, the balance and the like stored in the data storage device 20 is read out and is transmitted to the cyber electronic money system 30 ((3)). At the same time, history information in the data storage device is also extracted by the cyber money system ((4)). During a period when the processing is performed, the indication that processing is being performed is given on the display.

Figure 28:
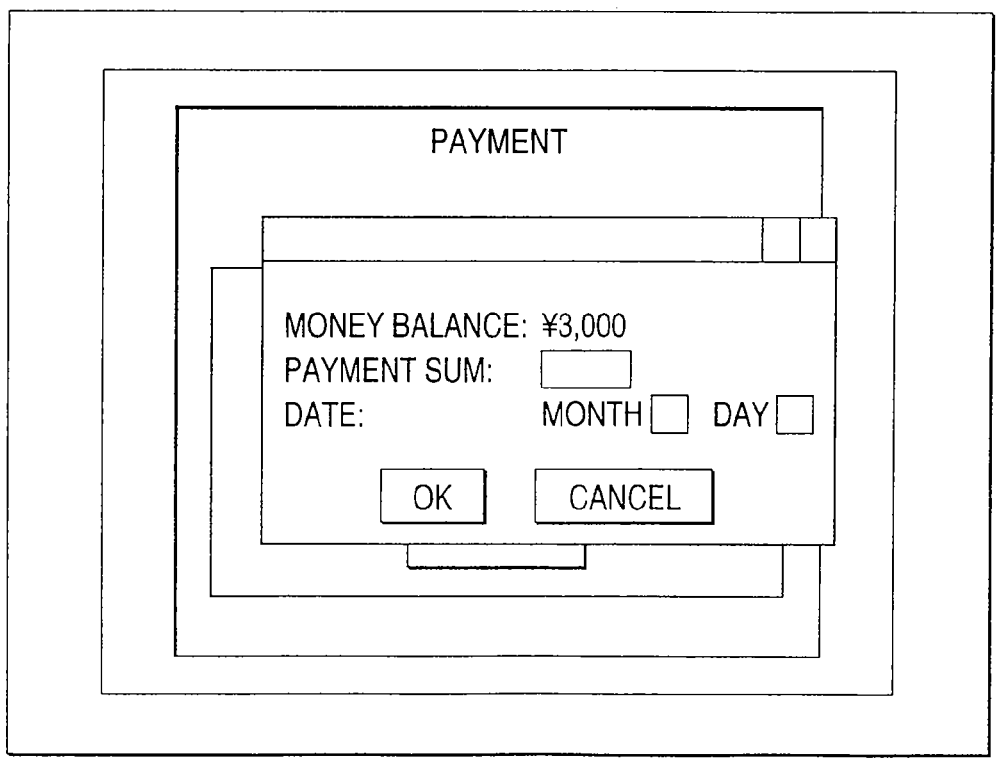
FIG. 28 is a view of a screen constitution example displayed in the client device during the payment operation of the electronic settlement system shown in FIG. 1.
Figure 29:
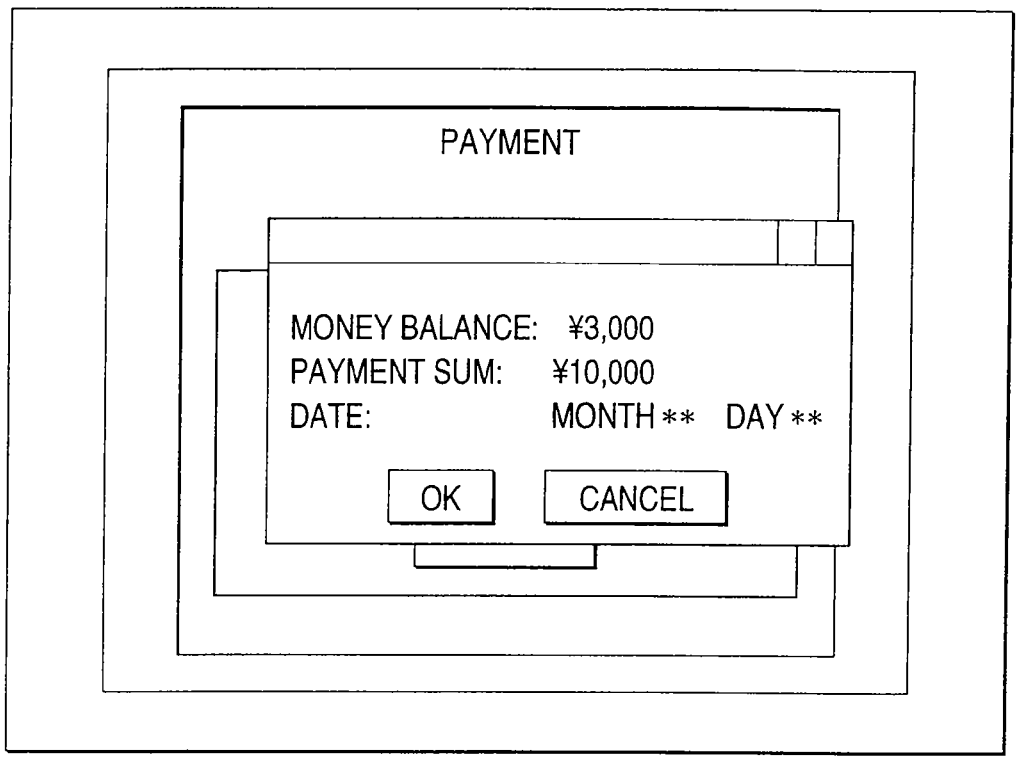
FIG. 29 is a view of a screen constitution example displayed in the client device during the payment operation of the electronic settlement system shown in FIG. 1.
Figure 30:
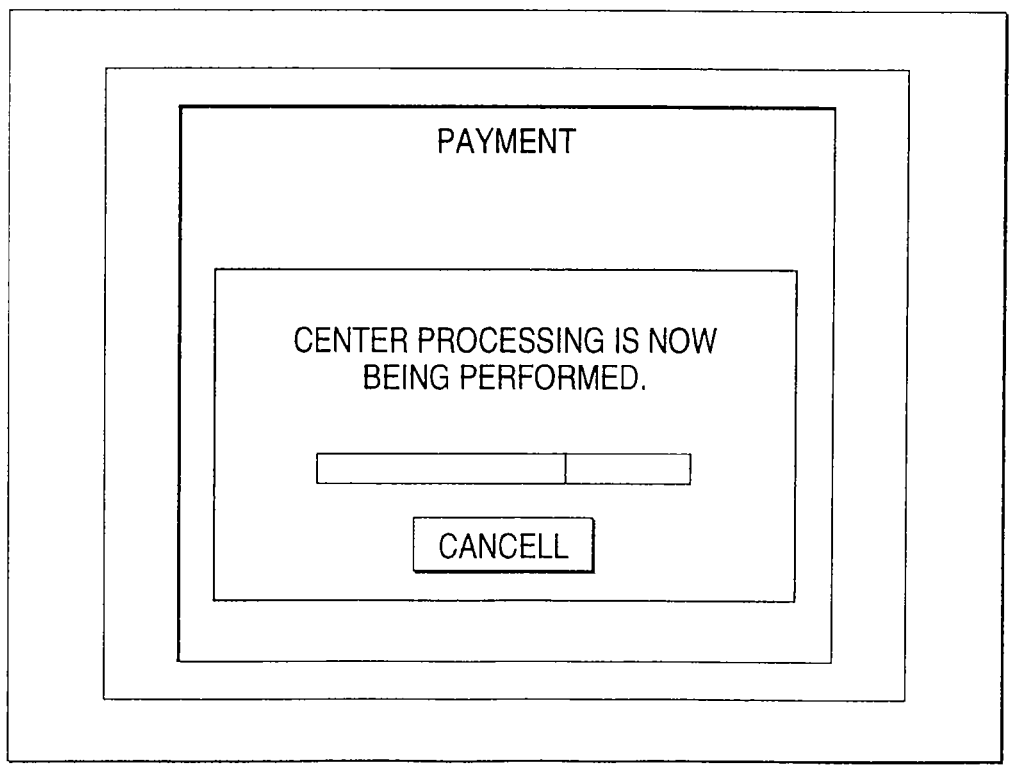
FIG. 30 is a view of a screen constitution example displayed in the client device during the payment operation of the electronic settlement system shown in FIG. 1.

Next, while referring to the screen as shown in FIGS. 28 and 29, the user operates the keyboard or mouse of the personal computer 22 to input a payment sum, a credit card number, an effective period, and a personal identification number and to transmit them to the cyber electronic money system ((3)). At the same time, the history information or the like in the data storage device is also extracted by the cyber electronic money system ((4)). During a period when the processing is performed, the indication that processing is being performed is given on the display as shown in FIG. 30.

When receiving payment request information as described above, the cyber electronic money system 30 requests a credit permission device 35 to approve a credit settlement request ((5)). After carefully examining the credit information, the credit permission device 35 determines whether or not the credit settlement request is permitted. Incidentally, since the detailed structure of the credit permission device 35 does not directly relate to the present invention, the detailed description is omitted.

In the case where the result of credit permission is affirmative, the cyber electronic money system creates value update information. The cyber electronic money system encrypts the value update information by a common key shared by the settlement management device 3 and the data storage device 20.

Further, the value update information is given a fifth signature created by the private key of the settlement management device 3, and is transmitted to the personal computer 22 of the user 2. The personal computer 22 of the user 2 checks the validity of the transmitted value update information by the public key corresponding to the private key of the settlement management device 3, and if it is valid, the value update information is decrypted by the common key shared by the settlement management device 3 and the data storage device 20. The value information in the data storage device 20 is updated on the basis of the decrypted value information ((6)).

Figure 31:
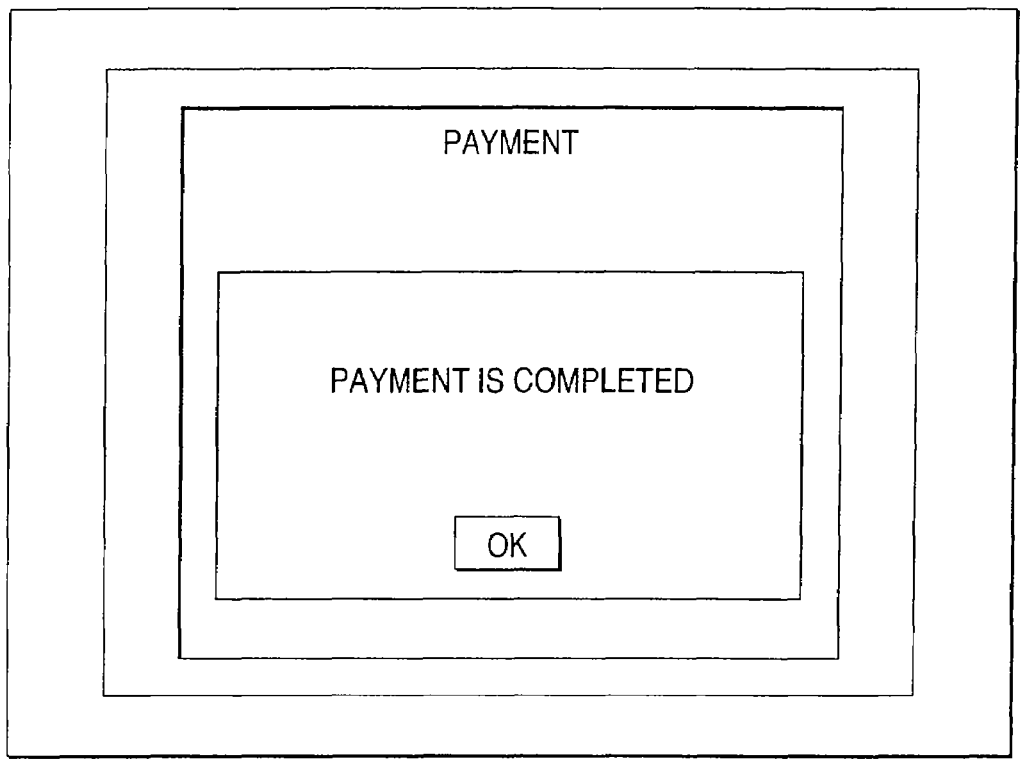
FIG. 31 is a view of a screen constitution example displayed in the client device during the payment operation of the electronic settlement system shown in FIG. 1.
Figure 32:
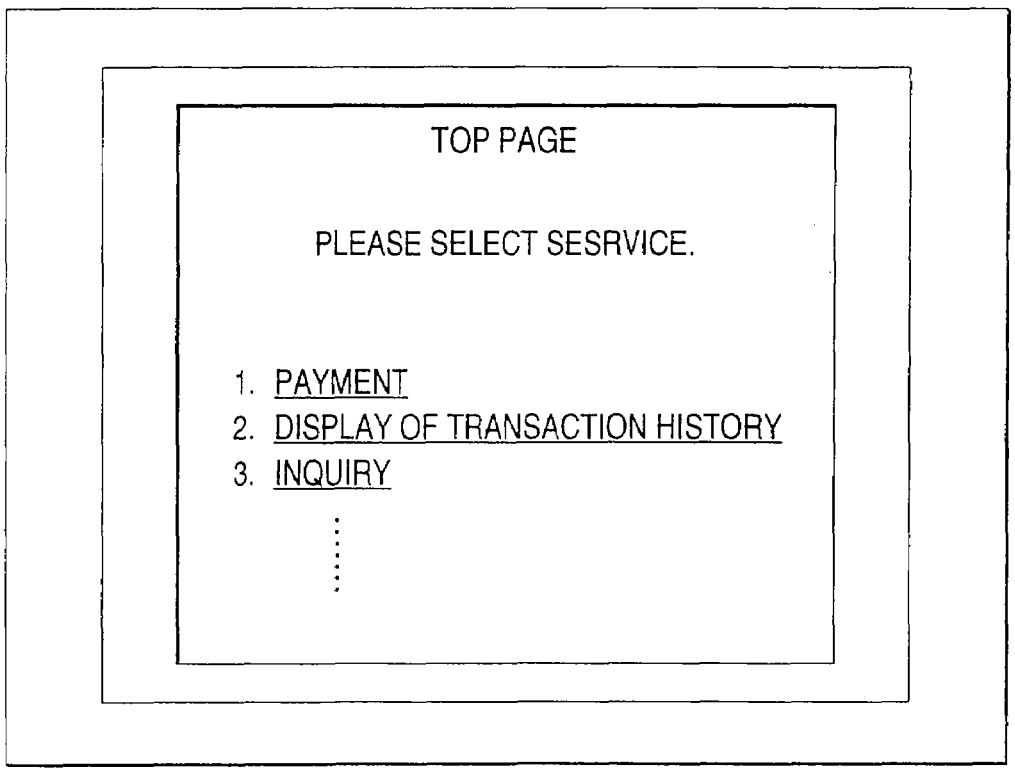
FIG. 32 is a view of a screen constitution example displayed in the client device during the payment operation of the electronic settlement system shown in FIG. 1.

The personal computer 22 transmits a payment completion screen request to the cyber electronic money system 30 ((7)), and a payment completion screen as shown in FIG. 31 is displayed on the display of the personal computer 22 ((8)). Thereafter, as shown in FIG. 32, the procedure returns to the top page of the cyber electronic money system, and the series of value update processings are completed.

Incidentally, card log information with respect to the series of processings is transmitted to the information management server 32 for the careful examination and settlement system and is stored.

As described above, according to the electronic money payment system using the settlement system of this embodiment, the common key KC is stored in the memory 52 of the data storage device 20 such as the IC card and a private key is not stored. Thus, even in the case where the user 2 lost the data storage device 20, since the private key is not stored in the memory 52, it is possible to prevent signature of the user 2 from being dishonestly put by using the private key.

Besides, according to the electronic settlement system 1, since the common key is used only in the inside of the data storage device 20 and the security server 31, the fear that the common key is stolen can be made low, and safe payment management can be realized, and further, key management can be made easy.

Although the preferred embodiments of the electronic settlement system of the present invention have been described with reference to the accompanying drawings, the present invention is not limited to the embodiments. It is obvious to one skilled in the art to conceive various modified examples or revised examples in the scope of technical concept recited in the scope of patent claims, and it is understood that those are naturally included in the technical scope of the present invention.

For example, in the foregoing embodiments, as shown in FIG. 1, although the case has been exemplified in which the application server 30, the security server 31, and the information management server 32 are separately provided in the settlement management device 3, the functions of these servers may be realized by one server.

Besides, in the foregoing embodiments, although the case has been exemplified in which the balance information in the data storage device 20 such as the IC card is read out to the application server 30, the balance information may not be read out to the application server 30.

Although the series of processings of the electronic settlement method according to the present invention and the processing carried out by each of the settlement management device, the store device, and the client device can be executed by hardware, they can also be executed by software. In the case where the series of processings are executed by the software, a computer may be provided in which a program constituting the software is installed in dedicated hardware, or the program is stored in a package medium such as a floppy disk or a CD-ROM and may be provided to, for example, a multi-purpose personal computer which can execute various functions by installing various programs, or the program may be downloaded through a communication network such as a portable telephone network or the Internet.

As described above, the present invention can provide an electronic settlement system in which electronic commercial transactions through a network are safely carried out by using a data storage device holding a common key, a settlement management device, a store device, a client device, a data storage device, a computer program, and a storage medium.

Especially, according to the electronic settlement system and the like of the present invention, the common key is stored in the memory 52 of the data storage device 20 such as the IC card and a private key is not stored. Thus, even in the case where the user lost the data storage device, since the private key is not stored in the memory, it is possible to prevent signature of the user from being dishonestly put by using the private key.

Besides, according to the electronic settlement system and the like of the present invention, since the common key is used only in the inside of the data storage device and the security server, the fear that the common key is stolen can be made low, and safe transactions can be realized, and further, key management can be made easy.

Besides, according to the electronic settlement system and the like of the present invention, when various information and request circulating the network is transmitted and received, signature check using the private key and the public key is performed, so that it is possible to prevent the information and request from being dishonestly falsified on the network, and safety of transactions using the network can be secured.

As described above, according to the electronic settlement system and the like of the present invention, the procedures accompanying the settlement processing or payment processing can be lessened as compared with the prior art, information transmission through the network can be reduced, the amount of use of the network can be reduced, and the processing time can be shortened.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A settlement management device which can update value information stored in a data storage device through a client device, comprising:
   a transmitting part transmitting a request for credit information;
   a receiving part receiving a response to the request for credit information;
   an encryption part subjecting value update information of the data storage device to an encryption processing by using a common key shared by the settlement management device and the data storage device based on the response to the request for credit information; and
   a transmitting part transmitting the value update information subjected to the encryption processing to the client device and, wherein the client device inputs the received value update information to the data storage device, and for transmitting settlement completion information to a the client device.

2. A settlement management device according to claim 1, wherein the settlement management device creates a signature indicating validity of the value update information by using a private key of the settlement management device, and transmits the value update information with the signature to the client device, and wherein the client device checks validity of the signature received from the settlement management device by using a public key corresponding to the private key of the settlement management device, and then inputs the value update information to the data storage device.

3. A computer program, encoded on a computer readable medium, the computer program including executable instruction that when executed cause a computer to function as a settlement management device updating value information stored in a data storage device through a client device, wherein the settlement management device transmits a request for credit information, receives a response to the request for credit information, subjects value update information of the data storage device to an encryption processing by using a common key shared by the settlement management device and the data storage device based on the response to the request for credit information, and transmits the value update information subjected to the encryption processing to the client device, and wherein the client device inputs the received value update information to the data storage device, and transmits settlement completion information to the client device.

4. A computer readable storage medium storing a computer program for causing a computer to function as a settlement management device which can update value information stored in a data storage device through a client device, wherein the settlement management device transmits a request for credit information, receives a response to the request for credit information, subjects value update information of the data storage device to an encryption processing by using a common key shared by the settlement management device and the data storage device based on the response to the request for credit information, and transmits the value update information subjected to the encryption processing to the client device, and wherein the client device inputs the received value update information to the client device.

5. A settlement management device according to claim 1, wherein the settlement completion information includes a payment completion screen presented to the client device.

6. A computer program according to claim 3, further comprising causing the computer to transmit settlement completion information in response to a request by the client device.

7. A computer readable storage medium according to claim 4, further comprising causing the computer to transmit settlement completion information in response to a request by the client device.

* * * * *